US012748302B2

(12) United States Patent
Tabayashi et al.

(10) Patent No.: US 12,748,302 B2
(45) Date of Patent: Sep. 29, 2026

(54) PHOSPHOR UNIT, LIGHT SOURCE DEVICE, AND PROJECTOR

(71) Applicant: SEIKO EPSON CORPORATION, Tokyo (JP)

(72) Inventors: Kosuke Tabayashi, Azumino (JP); Norikazu Kadotani, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 306 days.

(21) Appl. No.: 18/405,119

(22) Filed: Jan. 5, 2024

(65) Prior Publication Data

US 2024/0255750 A1 Aug. 1, 2024

(30) Foreign Application Priority Data

Jan. 6, 2023 (JP) ................................ 2023-000917

(51) Int. Cl.
*G02B 26/00* (2006.01)
*G03B 21/16* (2006.01)
*G03B 21/20* (2006.01)

(52) U.S. Cl.
CPC ........... *G02B 26/008* (2013.01); *G03B 21/16* (2013.01); *G03B 21/204* (2013.01); *G03B 21/2066* (2013.01); *G03B 21/208* (2013.01)

(58) Field of Classification Search
None
See application file for complete search history.

(56) References Cited

U.S. PATENT DOCUMENTS

2018/0088317 A1* 3/2018 Yoshikawa .............. G02B 5/20
2018/0224731 A1 8/2018 Yoshikawa
2020/0271307 A1* 8/2020 Wu ......................... F21V 29/76
2020/0310233 A1* 10/2020 Kadotani ........... H05K 7/20327
2020/0355992 A1 11/2020 Yui et al.
2020/0371415 A1 11/2020 Arai et al.
2022/0316661 A1* 10/2022 Nishi .................... F21V 29/717
(Continued)

FOREIGN PATENT DOCUMENTS

JP 2018-022000 A 2/2018
JP 2020-201387 A 12/2020
WO WO 2016/127935 A 8/2016
(Continued)

*Primary Examiner* — Jyotsna V Dabbi
(74) *Attorney, Agent, or Firm* — Dority & Manning, P.A.

(57) ABSTRACT

A phosphor unit includes: a phosphor wheel; a peripheral wall surrounding the phosphor; a heat receiving plate facing the phosphor wheel, and spaced apart from the phosphor wheel; and a heat receiving fin fixed to the heat receiving plate and surrounded by the peripheral wall. The phosphor wheel includes a substrate configured to rotate around the rotation axis, a wavelength conversion portion, and a heat dissipating fin, and including first fins that generate an airflow in a direction from a center toward outside by rotation of the substrate and dissipate heat transferred from the wavelength conversion portion to the airflow. The heat receiving fin includes second fins through which an airflow circulating from the phosphor wheel to the phosphor wheel via the peripheral wall and the heat receiving plate flows, and that receives heat from the flowing airflow and transfers the heat to the heat receiving plate.

20 Claims, 24 Drawing Sheets

(56) References Cited

U.S. PATENT DOCUMENTS

2023/0014373 A1* 1/2023 Hansen .................. G03B 21/16

FOREIGN PATENT DOCUMENTS

| | | | |
|---|---|---|---|
| WO | WO2017/098705 | A | 6/2017 |
| WO | WO 2017/098706 | A | 6/2017 |
| WO | WO 2019/098125 | A | 5/2019 |
| WO | WO 2019/150698 | A | 8/2019 |

* cited by examiner

RELATIONSHIP BETWEEN INTERSECTION ANGLE γ AND FLOW VELOCITY

PHOSPHOR UNIT, LIGHT SOURCE DEVICE, AND PROJECTOR

The present application is based on, and claims priority from JP Application Serial Number 2023-000917, filed Jan. 6, 2023, the disclosure of which is hereby incorporated by reference herein in its entirety.

BACKGROUND

1. Technical Field

The present disclosure relates to a phosphor unit, a light source device, and a projector.

2. Related Art

In related art, there is known a projector that modulates light emitted from a light source to form image light and projects the formed image light (for example, see JP-A-2018-22000).

A projector disclosed in JP-A-2018-22000 includes an illumination device, a relay optical system, a video generation unit, a projection optical system, and a cabinet. The illumination device includes a plurality of semiconductor lasers that emit blue light and a phosphor wheel device.

The phosphor wheel device includes a phosphor wheel that converts excitation light into fluorescent light, and a heat dissipating structure that cools the phosphor wheel.

The heat dissipating structure includes: a housing that accommodates the phosphor wheel containing a phosphor, a heat exchange portion that includes a plate member formed in a corrugated plate shape; a rotating fin that generates an airflow inside the housing, and a cooling fan. Among these, the rotating fin is driven to rotate together with the phosphor wheel by a wheel motor of the phosphor wheel.

In such a phosphor wheel device, the blue light emitted from the semiconductor lasers is sequentially incident on two phosphor regions of the rotating phosphor wheel. One phosphor region is excited by the incident blue light to emit green light, and the other phosphor region is excited by the incident blue light to emit red light.

The rotating fin that rotates together with the phosphor wheel generates an airflow in a radial direction, and generate an airflow inside the housing. Air heated by the phosphor wheel hits an inner surface of the heat exchange portion, and a part of heat of the phosphor wheel is conducted to the heat exchange portion. The cooling fan cools the heat exchange portion by generating an airflow toward an outer surface of the heat exchange portion. Accordingly, heat exchange from the inner surface to the outer surface of the plate member of the heat exchange portion is promoted, the air in the housing is cooled, and consequently, the phosphor wheel is cooled.

JP-A-2018-22000 is an example of the related art.

SUMMARY

In the phosphor wheel device disclosed in JP-A-2018-22000, since the plate member is formed in the corrugated plate shape, the air in the housing heated by the phosphor wheel enters a recess of the plate member and transfers heat to the inner surface of the plate member. However, since there is no path for air to pass beyond the recess, the air having entered the recess may tend to remain in the recess even after being cooled. That is, the airflow in the housing may not be efficiently circulated and cooling efficiency of the phosphor wheel may be low.

Therefore, there has been a demand for a configuration capable of improving the cooling efficiency of the phosphor wheel.

According to a first aspect of the present disclosure, there is provided a phosphor unit including: a phosphor wheel configured to rotate around a rotation axis; a peripheral wall surrounding the phosphor wheel along a circumferential direction around the rotation axis; a heat receiving plate intersecting the rotation axis on the rotation axis, facing the phosphor wheel, and spaced apart from the phosphor wheel; and a heat receiving fin fixed to the heat receiving plate and surrounded by the peripheral wall. The phosphor wheel includes a substrate having a first surface and a second surface provided on an opposite side from the first surface and facing the heat receiving plate, and configured to rotate around the rotation axis, a wavelength conversion portion disposed on the first surface and containing a phosphor that converts a wavelength of incident light, and a heat dissipating fin disposed on the second surface, and including a plurality of first fins that generate an airflow in a direction from a center of the second surface toward outside by rotation of the substrate and dissipate heat transferred from the wavelength conversion portion to the generated airflow. The heat receiving fin includes a plurality of second fins through which an airflow circulating from the phosphor wheel to the phosphor wheel via the peripheral wall and the heat receiving plate flows, and that receives heat from the flowing airflow and transfers the heat to the heat receiving plate.

According to a second aspect of the present disclosure, there is provided a phosphor unit including: a phosphor wheel configured to rotate around a rotation axis; a heat receiving plate intersecting the rotation axis on the rotation axis, facing the phosphor wheel, and spaced apart from the phosphor wheel; and a heat receiving fin fixed to the heat receiving plate. The phosphor wheel includes a substrate having a first surface and a second surface that is provided on an opposite side from the first surface and faces the heat receiving plate, and configured to rotate around the rotation axis, a wavelength conversion portion disposed on the first surface and containing a phosphor that converts a wavelength of incident light, and a heat dissipating fin disposed on the second surface, and including a plurality of first fins that generate an airflow in a direction from a center of the second surface toward outside by rotation of the substrate and dissipate heat transferred from the wavelength conversion portion to the generated airflow. The heat receiving fin includes a plurality of second fins configured to transfer received heat to the heat receiving plate, and a peripheral wall portion located outside the plurality of second fins with respect to the rotation axis. The airflow flowing from the phosphor wheel circulates to the phosphor wheel via the peripheral wall portion and the plurality of second fins of the heat receiving fin.

According to a third aspect of the present disclosure, there is provided a light source device including: the phosphor unit according to the first or second aspect; and a solid-state light emitting element configured to emit excitation light incident on the phosphor unit. The phosphor unit emits light containing fluorescence obtained by converting a wavelength of the excitation light when the excitation light is incident on the phosphor unit.

According to a fourth aspect of the present disclosure, there is provided a projector including: the light source device according to the third aspect; a light modulation element configured to modulate light from the light source device into image light; and a projection optical device configured to project the image light.

DESCRIPTION OF EMBODIMENTS

First Embodiment

Hereinafter, a first embodiment of the present disclosure will be described with reference to the drawings.

General Configuration of Projector

Figure 1:
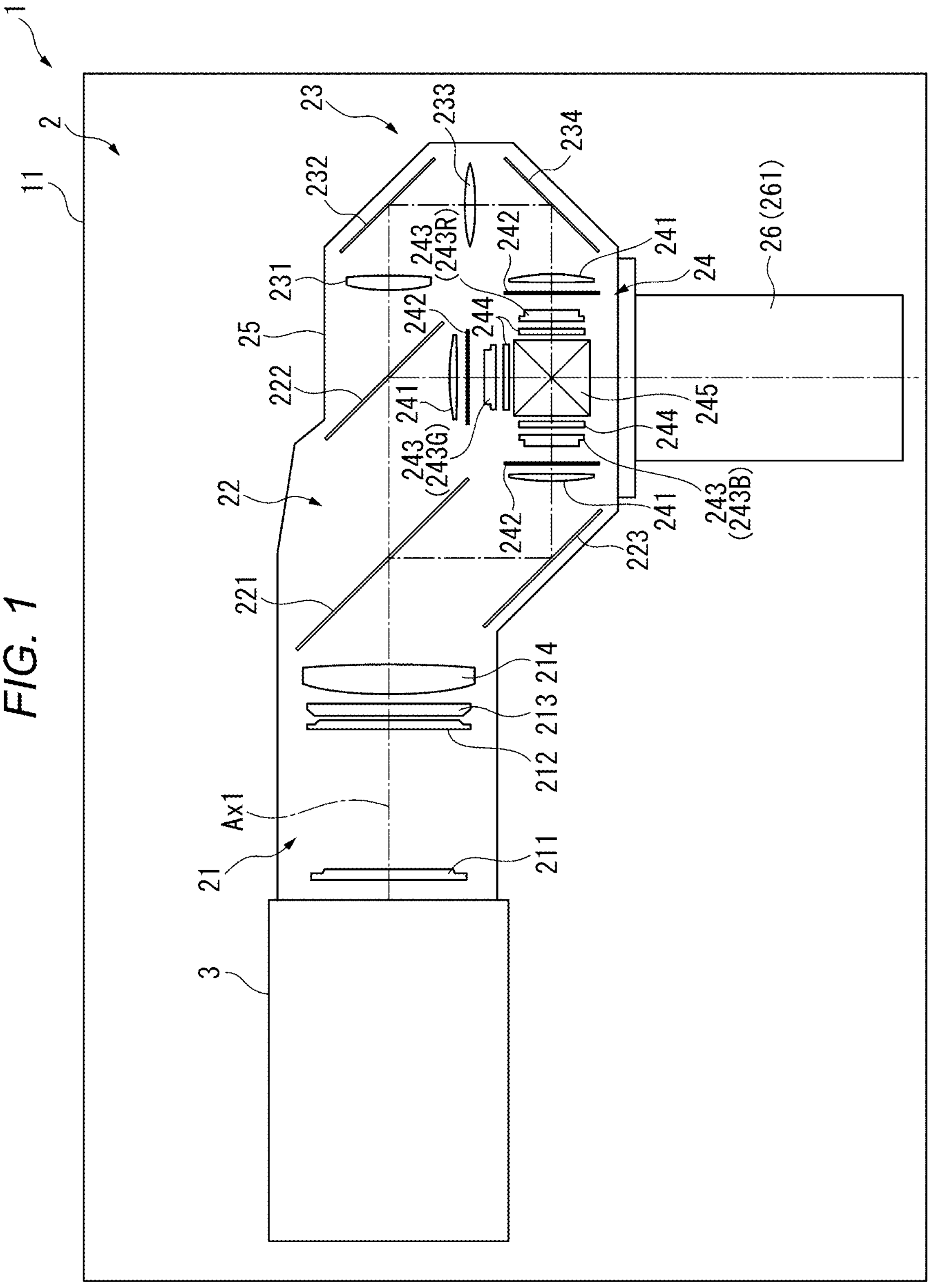
FIG. 1 is a schematic diagram showing a configuration of a projector according to a first embodiment.

FIG. 1 is a schematic diagram showing a configuration of a projector 1 according to the present embodiment.

The projector 1 according to the embodiment projects image light according to image information. As shown in FIG. 1, the projector 1 includes an exterior housing 11 and an image projection device 2 accommodated in the exterior housing 11. In addition, although not shown, the projector 1 includes a control device that controls an operation of the projector 1, a power supply device that supplies power to electronic components of the projector 1, and a cooling device that cools a cooling target of the projector 1.

Configuration of Image Projection Device

The image projection device 2 forms image light according to input image information and projects the formed image light. The image projection device 2 includes a light source device 3, a uniformization optical system 21, a color separation optical system 22, a relay optical system 23, an image formation device 24, an optical component housing 25, and a projection optical device 26.

The light source device 3 emits illumination light to the uniformization optical system 21. A configuration of the light source device 3 will be described in detail later.

The uniformization optical system 21 uniformizes the illumination light emitted from the light source device 3. The uniformized illumination light passes through the color separation optical system 22 and the relay optical system 23 and illuminates a modulation region of light modulation elements 243 to be described later. The uniformization optical system 21 includes two lens arrays 211 and 212, a polarization conversion element 213, and a superimposing lens 214.

The color separation optical system 22 separates the illumination light incident from the uniformization optical system 21 into red, green, and blue light. The color separation optical system 22 includes two dichroic mirrors 221 and 222, and a reflection mirror 223 that reflects the blue light separated by the dichroic mirror 221.

The relay optical system 23 is provided in an optical path of the red light longer than optical paths of other colored light, and reduces a loss of the red light. The relay optical system 23 includes an incident-side lens 231, a relay lens 233, and reflection mirrors 232 and 234. In the embodiment, the red light is guided to the relay optical system 23. However, the present disclosure is not limited thereto, and for example, a configuration may be adopted in which colored light having a longer optical path than other colored light is the blue light and the blue light is guided to the relay optical system 23.

The image formation device 24 modulates the incident red, green, and blue light, combines the modulated colored light, and forms image light. The image formation device 24 includes three field lenses 241, three incident-side polarization plates 242, three light modulation elements 243, three emission-side polarization plates 244, and one color combination optical system 245, which are provided according to the incident colored light.

The light modulation elements 243 modulate light from the light source device 3 into image light. Specifically, the light modulation elements 243 modulate the colored light incident from the incident-side polarization plate 242 according to an image signal, and emit the modulated colored light. The three light modulation elements 243 include a light modulation element 243R that modulates red light, a light modulation element 243G that modulates green light, and a light modulation element 243B that modulates blue light. Examples of the light modulation elements 243 include a transmissive liquid crystal panel.

The color combination optical system 245 combines the three types of colored light modulated by the light modulation elements 243R, 243G, and 243B. The image light combined by the color combination optical system 245 is incident on the projection optical device 26. The color combination optical system 245 includes a cross dichroic prism having a substantially rectangular parallelepiped shape in the embodiment, and may include a plurality of dichroic mirrors.

The optical component housing 25 accommodates therein the uniformization optical system 21, the color separation optical system 22, the relay optical system 23, and the image formation device 24. A designed optical axis Ax1 is set in the image projection device 2, and the optical component housing 25 holds the uniformization optical system 21, the color separation optical system 22, the relay optical system 23, and the image formation device 24 at predetermined positions on the optical axis Ax1. The light source device 3 and the projection optical device 26 are disposed at predetermined positions on the optical axis Ax1.

The projection optical device 26 projects the image light incident from the image formation device 24 onto a projection surface such as a screen. The projection optical device 26 may be, for example, a lens assembly including a plurality of lenses (not shown) and a lens barrel 261 that accommodates the plurality of lenses.

Configuration of Light Source Device

Figure 2:
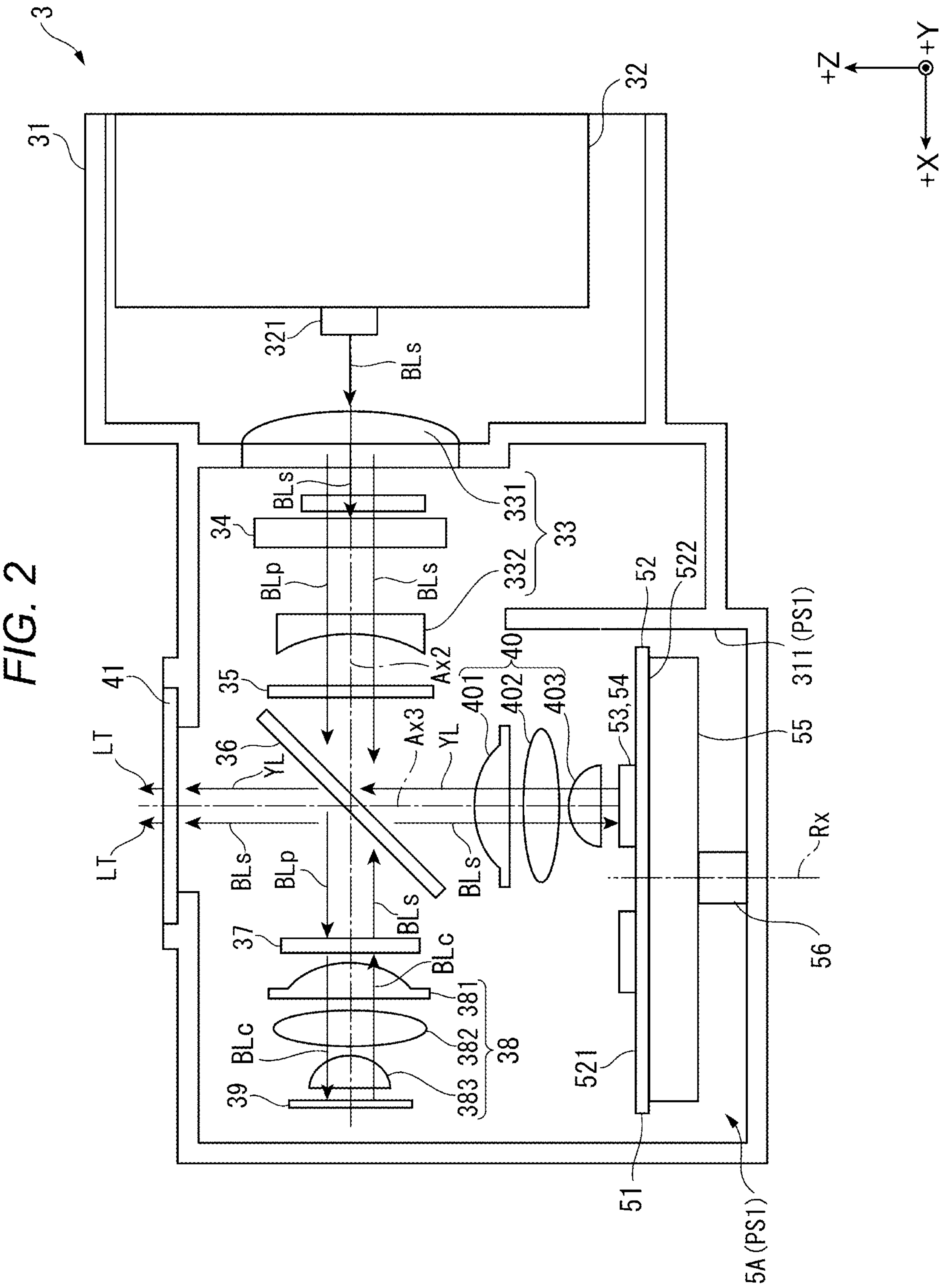
FIG. 2 is a schematic diagram showing a light source device according to the first embodiment.

FIG. 2 is a schematic diagram showing the light source device 3.

The light source device 3 emits the illumination light for illuminating the image formation device 24 to the uniformization optical system 21. As shown in FIG. 2, the light source device 3 includes a light source housing 31, a light source 32, an afocal optical element 33, a first phase difference element 34, a diffusion and transmission element 35, a light splitting and combination element 36, a second phase difference element 37, a first light collection element 38, a diffusion optical element 39, a second light collection element 40, a third phase difference element 41, and a wavelength conversion device 5A.

The light source housing 31 will be described in detail later.

An optical axis Ax2 extending linearly and an optical axis Ax3 orthogonal to the optical axis Ax2 and extending linearly are set in the light source device 3. The optical axis Ax3 overlaps the optical axis Ax1 in the uniformization optical system 21.

The light source 32, the afocal optical element 33, the first phase difference element 34, the diffusion and transmission element 35, the light splitting and combination element 36, the second phase difference element 37, the first light collection element 38, and the diffusion optical element 39 are disposed on the optical axis Ax2.

The wavelength conversion device 5A, the second light collection element 40, the light splitting and combination element 36, and the third phase difference element 41 are disposed on the optical axis Ax3.

In the following description, three directions orthogonal to one another are referred to as a +X direction, a +Y direction, and a +Z direction. In the embodiment, the +X direction is a direction in which the light source 32 emits light along the optical axis Ax2, and the +Z direction is a direction in which the light source device 3 emits illumination light along the optical axis Ax3. Although not shown, an opposite direction from the +X direction is referred to as a −X direction, an opposite direction from the +Y direction is referred to as a −Y direction, and an opposite direction from the +Z direction is referred to as a −Z direction.

Configuration of Light Source

The light source 32 includes at least one solid-state light emitting element 321, and the at least one solid-state light emitting element 321 emits light incident on the diffusion optical element 39 and the wavelength conversion device 5A in the +X direction. The solid-state light emitting element 321 emits blue light as excitation light. For example, the solid-state light emitting element 321 is a laser diode (LD) that emits laser light having a peak wavelength of 440 nm. The light emitted from the light source 32 is s-polarized blue light BLs for the light splitting and combination element 36. However, the present disclosure is not limited thereto, and the light emitted from the light source 32 may be p-polarized blue light BLp for the light splitting and combination element 36, or blue light in which s-polarized light and p-polarized light are mixed. In the latter case, the first phase difference element 34 can be omitted.

Configuration of Afocal Optical Element

The afocal optical element 33 adjusts a luminous flux diameter of the blue light BLs incident in the +X direction from the light source 32. The afocal optical element 33 includes a lens 331 that collects incident light and a lens 332 that collimates a light flux collected by the lens 331. The afocal optical element 33 may be omitted.

Configuration of First Phase Difference Element

The first phase difference element 34 is provided between the lens 331 and the lens 332. The first phase difference element 34 converts a part of the incident blue light BLs into blue light BLp, and emits light including s-polarized blue light BLs and p-polarized blue light BLp. The first phase difference element 34 may be rotated by a rotation device around a rotation axis along the optical axis Ax2. In this case, a ratio of an s-polarized component to a p-polarized component in the blue light emitted from the first phase difference element 34 can be adjusted according to a rotation angle of the first phase difference element 34.

Configuration of Diffusion and Transmission Element

The diffusion and transmission element 35 uniformizes illuminance distribution of the blue light BLp and BLs incident in the −Z direction from the lens 332. The blue light BLs and BLp that passed through the diffusion and transmission element 35 is incident on the light splitting and combination element 36. Examples of the diffusion and transmission element 35 include a configuration having a hologram, a configuration in which a plurality of small lenses are arranged in a plane orthogonal to an optical axis, and a configuration in which a surface through which light passes is a rough surface.

Instead of the diffusion and transmission element 35, a homogenizer optical element having a pair of multi-lenses may be adopted.

Configuration of Light Splitting and Combination Element

The light splitting and combination element 36 has a function as a light splitting element that splits incident light and a function as a light combination element that combines light incident from two directions.

The light splitting and combination element 36 is a polarized beam splitter, and splits the s-polarized component and the p-polarized component contained in the incident light. Specifically, the light splitting and combination element 36 reflects the s-polarized component and transmits the p-polarized component. The light splitting and combination element 36 has a color separation characteristic of transmitting light having a wavelength equal to or greater than a predetermined wavelength regardless of whether the polarized component is an s-polarized component or a p-polarized component. Therefore, of the blue light BLp and BLs incident on the light splitting and combination element 36 from the diffusion and transmission element 35, the p-polarized blue light BLp passes through the light splitting and combination element 36 in the +X direction and is incident on the second phase difference element 37. On the other hand, the s-polarized blue light BLs is reflected in the −Z direction by the light splitting and combination element 36 and is incident on the second light collection element 40.

The light splitting and combination element 36 may have a function of a half mirror that transmits a part of light incident from the light source 32 via the diffusion and transmission element 35 and reflects the remaining light, and a function of a dichroic mirror that reflects blue light incident from the diffusion optical element 39 and transmits fluorescence incident from the wavelength conversion device 5A and having a wavelength longer than a wavelength of the blue light. In this case, the first phase difference element 34 can be omitted.

Configuration of Second Phase Difference Element

The second phase difference element 37 is disposed in the +X direction with respect to the light splitting and combination element 36. That is, the second phase difference element 37 is disposed between the light splitting and combination element 36 and the first light collection element 38. The second phase difference element 37 converts the blue light BLp that passed through the light splitting and combination element 36 in the +X direction into circularly polarized blue light BLc. The blue light BLc that passed through the second phase difference element 37 in the +X direction is incident on the first light collection element 38.

Configuration of First Light Collection Element

The first light collection element 38 collects the blue light BLc, which is transmitted through the light splitting and combination element 36 in the +X direction and is incident from the second phase difference element 37, to the diffusion optical element 39. The first light collection element 38 collimates the light incident in the −X direction from the diffusion optical element 39 and emits the collimated light to the second phase difference element 37. The first light collection element 38 includes three lenses 381, 382, and 383 in the embodiment, and the number of lenses constituting the first light collection element 38 is not limited.

Configuration of Diffusion Optical Element

The diffusion optical element 39 diffuses the incident blue light BLc at the same diffusion angle as fluorescence YL emitted from the wavelength conversion device 5A. Specifically, the diffusion optical element 39 reflects and diffuses, in the −X direction, the blue light BLc incident in the +X direction from the first light collection element 38. The diffusion optical element 39 is a reflective element for Lambert reflection of the incident blue light BLc. The diffusion optical element 39 may be rotated by a rotation device around a rotation axis parallel to the optical axis Ax2. The blue light BLc diffused by the diffusion optical element 39 is incident on the second phase difference element 37 after passing through the first light collection element 38. When the blue light BLc incident on the diffusion optical element 39 is reflected by the diffusion optical element 39, the blue light BLc is converted into circularly polarized light whose rotation direction is opposite. Therefore, the blue light BLc incident on the second phase difference element 37 via the first light collection element 38 is converted into the s-polarized blue light BLs by the second phase difference element 37. Then, the blue light BLs is reflected in the +Z direction by the light splitting and combination element 36 and is incident on the third phase difference element 41.

Configuration of Second Light Collection Element

The second light collection element 40 collects the blue light BLs reflected in the −Z direction by the light splitting and combination element 36 to a wavelength conversion portion 53 (to be described later) of a phosphor wheel 51 provided in the wavelength conversion device 5A. The second light collection element 40 collimates the fluorescence YL incident in the +Z direction from the wavelength conversion portion 53, and emits the collimated fluorescence YL to the light splitting and combination element 36. The second light collection element 40 includes three lenses 401, 402, and 403 in the embodiment, and the number of lenses constituting the second light collection element 40 is not limited.

General Configuration of Wavelength Conversion Device

The wavelength conversion device 5A constitutes a phosphor unit PS1 together with a peripheral wall 311 of the light source housing 31 to be described later. That is, the light source device 3 includes the phosphor unit PS1.

The wavelength conversion device 5A includes the phosphor wheel 51 that converts a wavelength of the blue light BLs incident from the second light collection element 40 and emits the fluorescence YL. The phosphor wheel 51 is a so-called reflective wavelength conversion element, and emits the fluorescence YL in an opposite direction from an incident direction of the blue light BLs as excitation light. A configuration of the wavelength conversion device 5A will be described in detail later.

The fluorescence YL emitted from the wavelength conversion device 5A in the +Z direction is collimated by the second light collection element 40, and then is incident on the light splitting and combination element 36. As described above, since the light splitting and combination element 36 has a characteristic of transmitting the fluorescence YL, the fluorescence YL incident on the light splitting and combination element 36 along the +Z direction is transmitted through the light splitting and combination element 36 and incident on the third phase difference element 41. That is, the light incident on the third phase difference element 41 from the light splitting and combination element 36 is white light in which the blue light BLs and the fluorescence YL are mixed.

Configuration of Third Phase Difference Element

The third phase difference element 41 converts the white light containing the blue light BLs and the fluorescence YL incident from the light splitting and combination element 36 into white light in which s-polarized light and p-polarized light are mixed. The white light thus converted is emitted in the +Z direction as illumination light LT and is incident on the uniformization optical system 21.

Configuration of Light Source Housing

The light source housing 31 accommodates the light source 32, the afocal optical element 33, the first phase difference element 34, the diffusion and transmission element 35, the light splitting and combination element 36, the second phase difference element 37, the first light collection element 38, the diffusion optical element 39, the second light collection element 40, the third phase difference element 41, and a part of the wavelength conversion device 5A. The light source housing 31 is a sealed housing into which dust and the like hardly enter.

Configuration of Peripheral Wall

Figure 3:
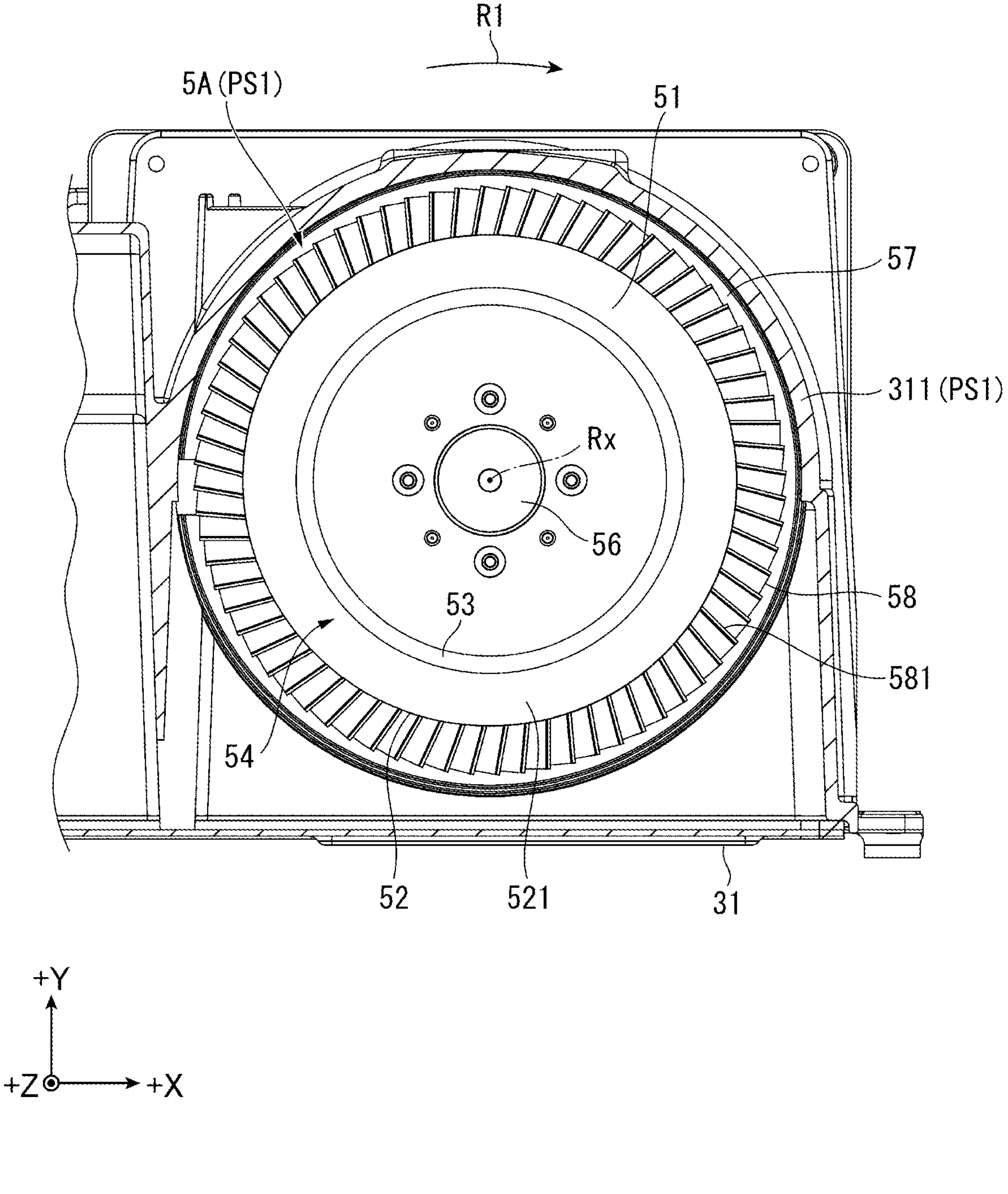
FIG. 3 is a cross-sectional view showing a peripheral wall according to the first embodiment.

FIG. 3 is a cross-sectional view showing the light source housing 31 at an arrangement position of the wavelength conversion device 5A. That is, FIG. 3 is a view showing a cross section of the peripheral wall 311 along an XY plane.

As shown in FIGS. 2 and 3, the light source housing 31 is disposed around the phosphor wheel 51 of the wavelength conversion device 5A, and includes the peripheral wall 311 surrounding the phosphor wheel 51 along a circumferential direction around a rotation axis Rx of the phosphor wheel 51.

The peripheral wall 311 constitutes a part of the phosphor unit PS1. As shown in FIG. 3, an inner edge of the peripheral wall 311 is formed in a circular shape matching a shape of the phosphor wheel 51 as viewed from an incident side of the blue light BLs. As will be described in detail later, when the phosphor wheel 51 rotates, an airflow that flows from a region on a rotation axis Rx side of the phosphor wheel 51 toward the outside of the phosphor wheel 51 is generated. The peripheral wall 311 turns the airflow that flowed toward the outside of the phosphor wheel 51 back to flow toward a heat receiving plate 57 and a heat receiving fin 58 to be described later.

The peripheral wall 311 is made of a metal having a high thermal conductivity, and the peripheral wall 311 receives heat from the airflow in contact with the peripheral wall 311 and releases the received heat from an outer surface of the peripheral wall 311.

Configuration of Wavelength Conversion Device

The wavelength conversion device 5A includes the phosphor wheel 51 as shown in FIGS. 2 and 3, and further includes a rotation device 56 as shown in FIG. 2.

The rotation device 56 includes, for example, a motor, and rotates a substrate 52 of the phosphor wheel 51. The rotation device 56 is disposed at a center of the phosphor wheel 51.

Configuration of Phosphor Wheel

The phosphor wheel 51 is rotated by the rotation device 56 around the rotation axis Rx along the optical axis Ax3. As shown in FIGS. 2 and 3, the phosphor wheel 51 includes the substrate 52, the wavelength conversion portion 53, and a reflection portion 54, and further includes a heat dissipating fin 55 shown in FIG. 2.

Configuration of Substrate

As shown in FIG. 3, the substrate 52 is, for example, a plate-shaped body formed in a disk shape, and is rotated by the rotation device 56 around the rotation axis Rx. The substrate 52 functions as a support body that supports the wavelength conversion portion 53, the reflection portion 54, and the heat dissipating fin 55, and also functions as a heat transfer body that transfers heat generated in the wavelength conversion portion 53 to the heat dissipating fin 55.

The substrate 52 has a first surface 521 facing the +Z direction and a second surface 522 provided on an opposite side from the first surface 521. The second surface 522 faces the heat receiving plate 57 to be described later.

Configuration of Wavelength Conversion Portion and Reflection Portion

As shown in FIGS. 2 and 3, the wavelength conversion portion 53 is disposed on the first surface 521. The wavelength conversion portion 53 includes a phosphor that converts a wavelength of excitation light incident from the second light collection element 40. That is, the wavelength conversion portion 53 is excited by the blue light BLs as the excitation light, and emits the non-polarized fluorescence YL having a wavelength longer than the wavelength of the blue light BLs. The fluorescence YL is light containing green light and red light, and further includes an s-polarized component and a p-polarized component for the light splitting and combination element 36.

As shown in FIG. 3, the wavelength conversion portion 53 is formed in a ring shape around the rotation axis Rx, and an incident position of the blue light BLs on the wavelength conversion portion 53 is moved with rotation of the substrate 52. Accordingly, the blue light BLs is prevented from continuing to be locally incident on the wavelength conversion portion 53, and a temperature of the wavelength conversion portion 53 is prevented from increasing locally. The wavelength conversion portion 53 generates heat when the blue light BLs is incident. A part of the heat generated by the wavelength conversion portion 53 is directly dissipated from the wavelength conversion portion 53, and other heat is transferred to the substrate 52 via the reflection portion 54 and dissipated.

The reflection portion 54 is provided between the wavelength conversion portion 53 and the first surface 521, and reflects the light incident from the wavelength conversion portion 53 in the +Z direction. When the first surface 521 can be used as a reflection surface, the reflection portion 54 may be omitted.

Configuration of Heat Dissipating Fin

As shown in FIG. 2, the heat dissipating fin 55 is disposed on the second surface 522 and rotates together with the substrate 52. The heat of the wavelength conversion portion 53 is transferred to the heat dissipating fin 55 via the substrate 52. When the substrate 52 rotates, an airflow flowing from a center of the second surface 522 toward the outside as viewed from the −Z direction is generated by the heat dissipating fin 55. The heat dissipating fin 55 dissipates the heat transferred from the wavelength conversion portion 53 to the generated airflow.

Figure 4:
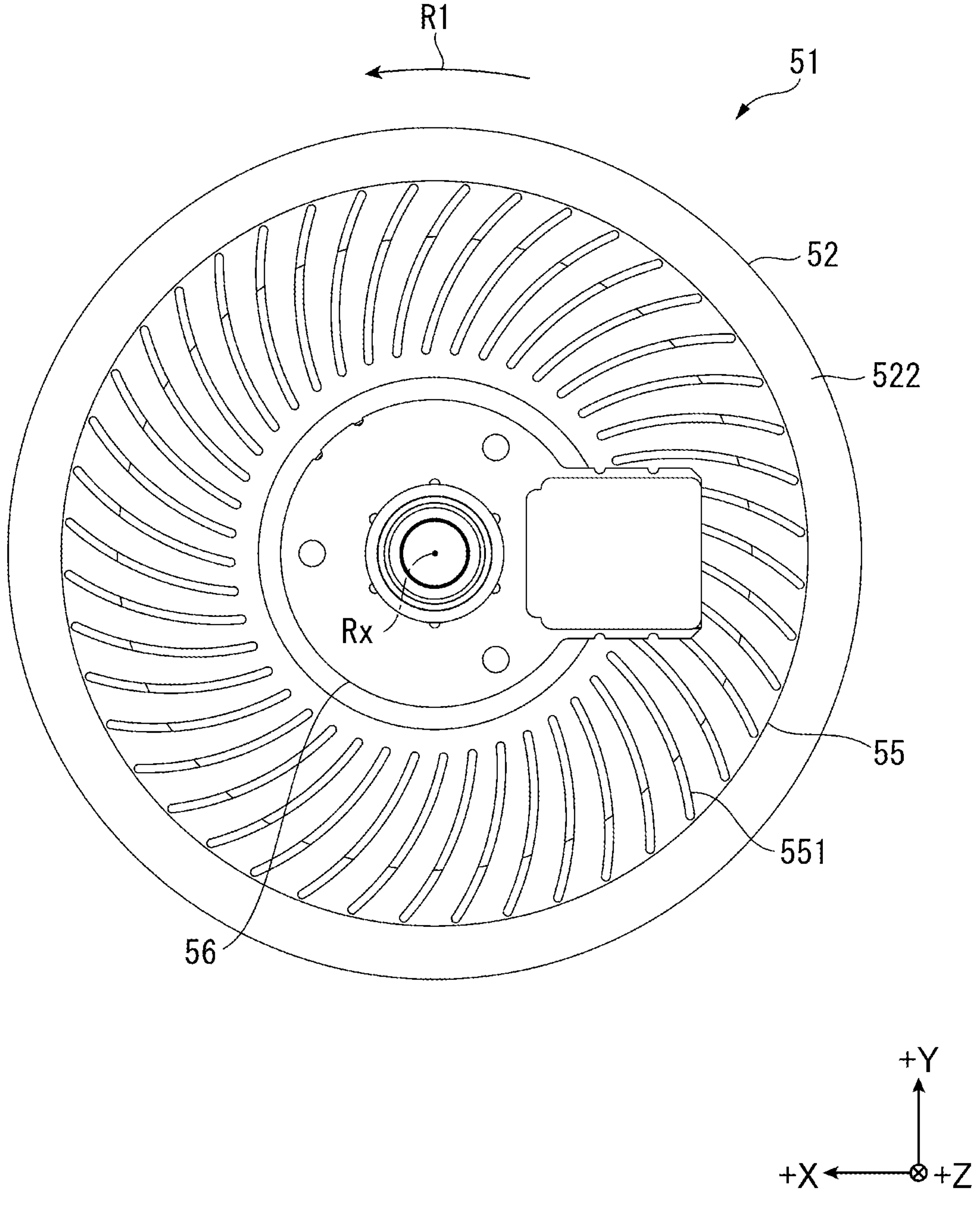
FIG. 4 is a view showing a phosphor wheel according to the first embodiment.

FIG. 4 is a view of the phosphor wheel 51 viewed from an opposite side from the incident side of the blue light BLs. That is, FIG. 4 is a view showing the heat dissipating fin 55 viewed from the −Z direction. In FIG. 4, only some of a plurality of first fins 551 constituting the heat dissipating fin 55 are denoted by reference numerals.

As shown in FIG. 4, the heat dissipating fin 55 includes the plurality of first fins 551.

The plurality of first fins 551 each extend from an end portion on the rotation axis Rx side toward the outside of the phosphor wheel 51, and are disposed along the circumferential direction around the rotation axis Rx. Specifically, each of the plurality of first fins 551 is curved in an opposite direction from the R1 direction, which is a rotation direction of the phosphor wheel 51, toward the outside of the phosphor wheel 51.

When the substrate 52 provided with the heat dissipating fin 55 rotates in the R1 direction, an airflow that flows from a center side of the second surface 522 toward the outside of the substrate 52 is generated.

Another Configuration of Wavelength Conversion Device

Figure 5:
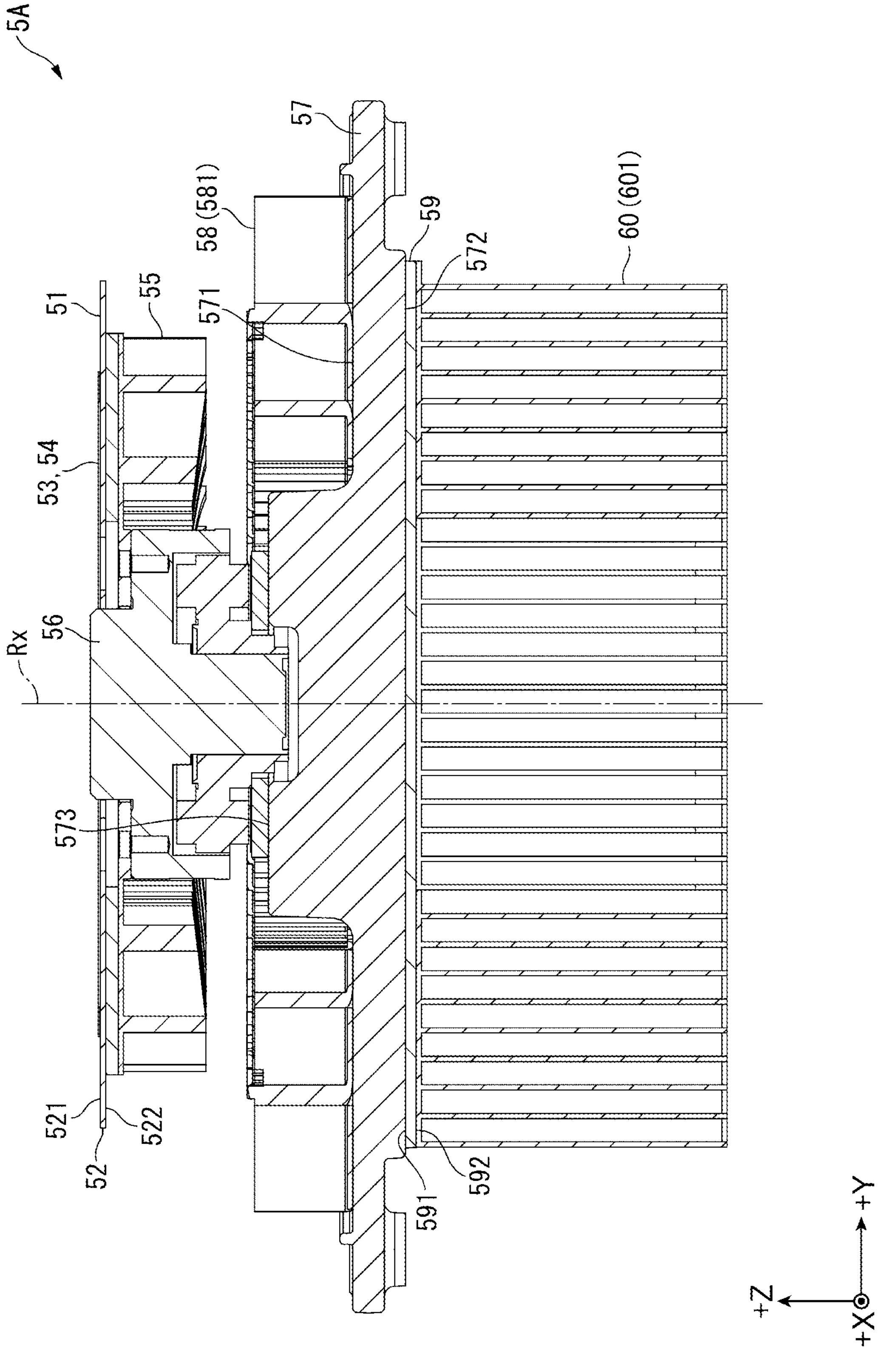
FIG. 5 is a cross-sectional view showing a wavelength conversion device according to the first embodiment.

FIG. 5 is a view showing a cross section of the wavelength conversion device 5A along a YZ plane.

As shown in FIG. 5, the wavelength conversion device 5A includes the heat receiving plate 57, the heat receiving fin 58, a thermoelectric conversion element 59, and a heat dissipating device 60 in addition to the phosphor wheel 51 and the rotation device 56. That is, as shown in FIGS. 2 and 5, the phosphor unit PS1 includes the peripheral wall 311, the phosphor wheel 51, the rotation device 56, the heat receiving plate 57, the heat receiving fin 58, the thermoelectric conversion element 59, and the heat dissipating device 60.

Configuration of Heat Receiving Plate

The heat receiving plate 57 is fixed to the light source housing 31 and seals the light source housing 31. The heat receiving plate 57 is disposed intersecting the rotation axis Rx on the rotation axis Rx, facing the phosphor wheel 51, and spaced apart from the phosphor wheel 51. The heat receiving plate 57 receives heat from a heated airflow that flows along the heat dissipating fin 55 of the rotating phosphor wheel 51. Specifically, the heat receiving plate 57 receives the heat directly from the airflow and receives the heat transferred from the heat receiving fin 58. The heat receiving plate 57 includes a heat receiving surface 571 facing the phosphor wheel 51, an opposite-side heat dissipating surface 572 from the heat receiving surface 571, and an arrangement portion 573.

The heat receiving surface 571 faces the +Z direction and faces the second surface 522 of the phosphor wheel 51. The heat receiving fin 58 is provided on the heat receiving surface 571.

The heat dissipating surface 572 faces the −Z direction. The thermoelectric conversion element 59 is coupled to the heat dissipating surface 572.

The arrangement portion 573 is a portion protruding from a center of the heat receiving surface 571 toward a phosphor wheel 51 side from the heat receiving surface 571. The rotation device 56 is disposed in the arrangement portion 573. That is, the heat receiving plate 57 intersects the rotation axis Rx on the rotation axis Rx.

In the embodiment, the heat receiving plate 57 is formed of a vapor chamber, and the heat transferred to the heat receiving surface 571 is diffused inside the heat receiving plate 57 and transferred to the heat dissipating surface 572. Accordingly, the heat received by the heat receiving surface 571 can be efficiently transported to the heat dissipating surface 572. However, the present disclosure is not limited thereto, and the heat receiving plate 57 may be a metal plate made of copper or the like.

Configuration of Heat Receiving Fin

Figure 6:
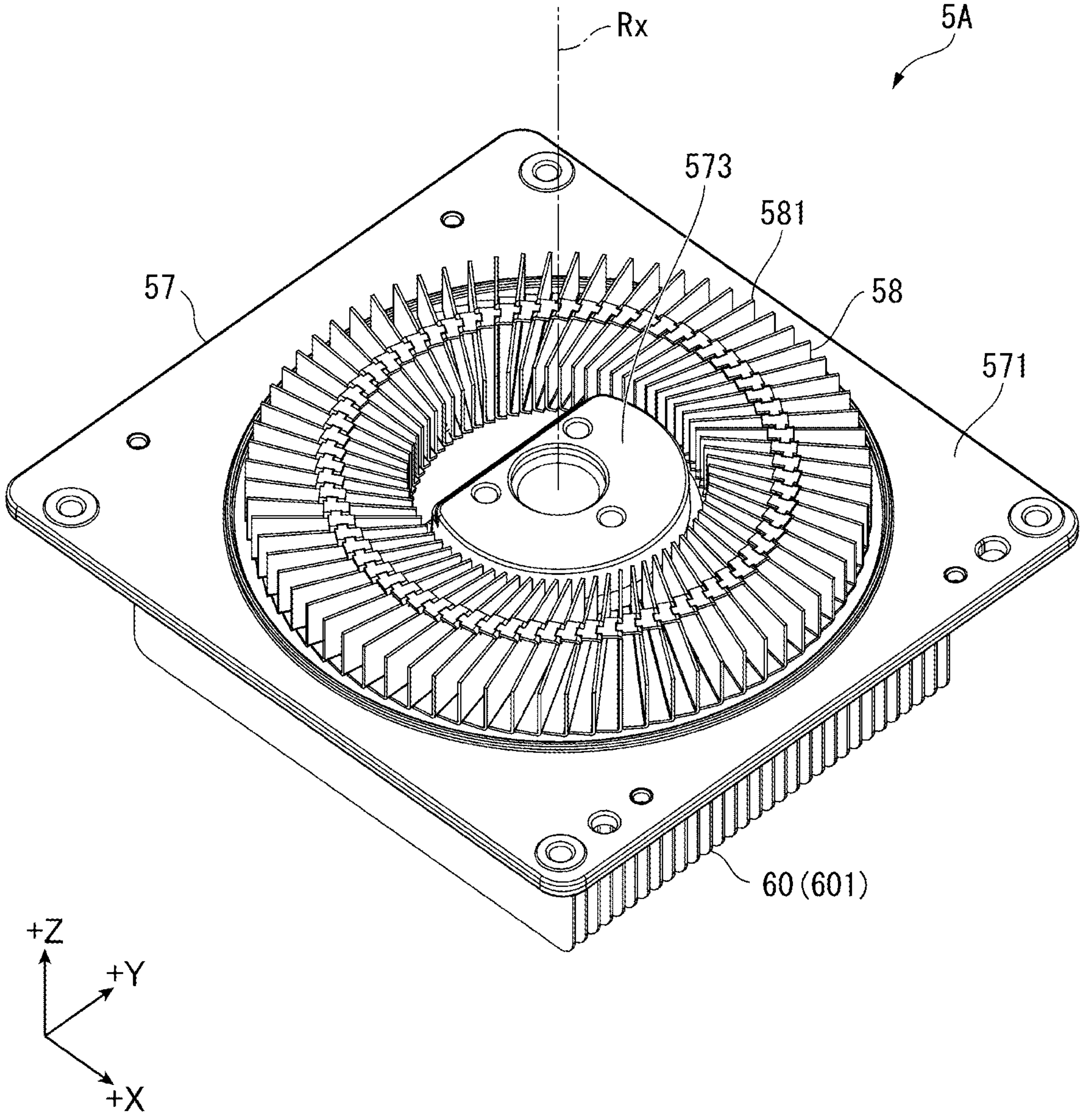
FIG. 6 is a perspective view showing a heat receiving fin according to the first embodiment.
Figure 7:
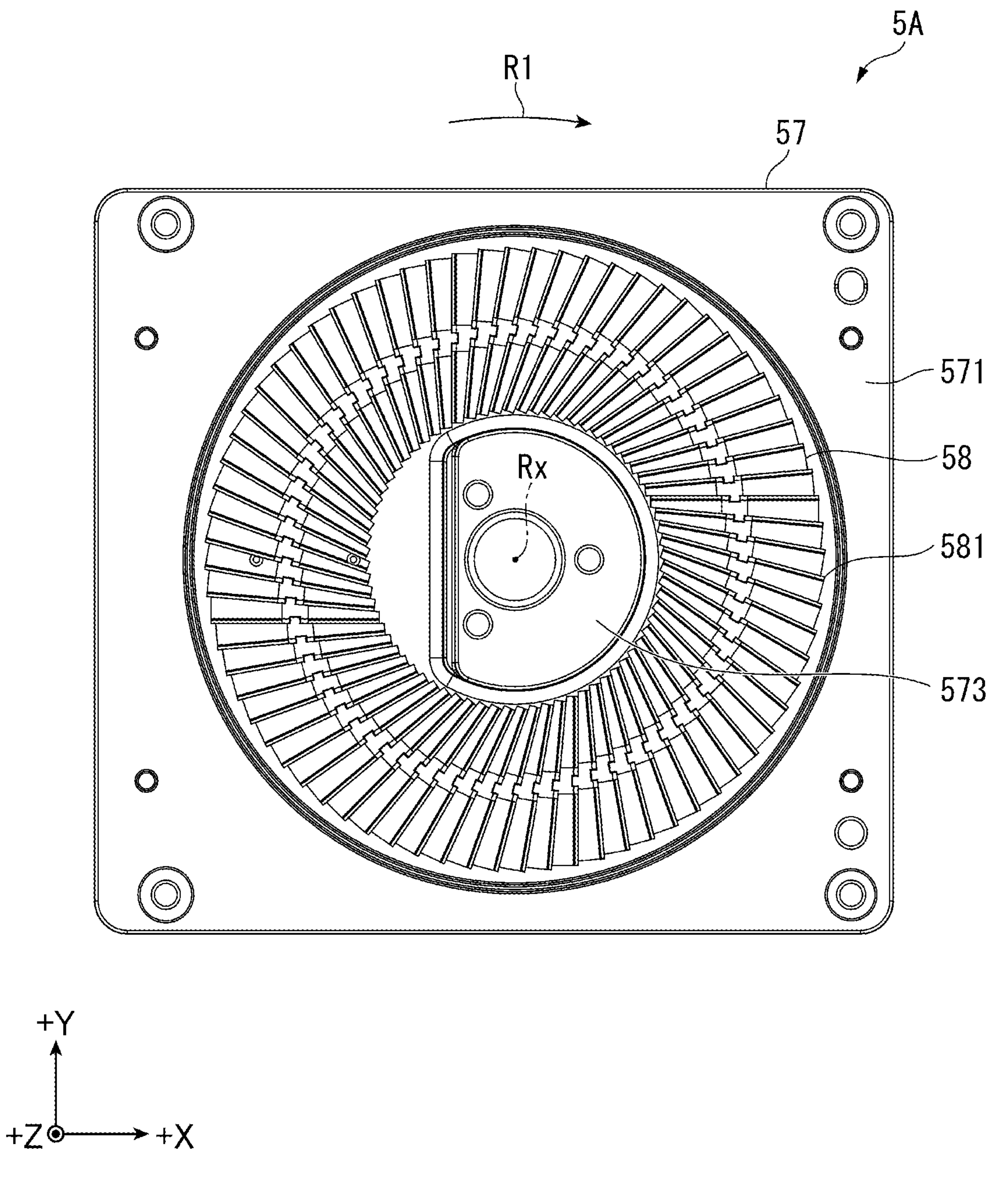
FIG. 7 is a plan view showing the heat receiving fin according to the first embodiment.

FIG. 6 is a perspective view of the heat receiving fin 58 viewed from the +Z direction. FIG. 7 is a plan view of the heat receiving fin 58 viewed from the +Z direction.

As shown in FIGS. 6 and 7, each of an inner peripheral edge and an outer peripheral edge of the heat receiving fin 58 is formed in a substantially circular shape around the rotation axis Rx as viewed from the phosphor wheel 51 side. That is, the heat receiving fin 58 is formed in a ring shape around the rotation axis Rx so as to avoid the arrangement portion 573. As shown in FIG. 3, an outer diameter of the heat receiving fin 58 around the rotation axis Rx is larger than an outer diameter of the phosphor wheel 51 around the rotation axis Rx.

A center of the heat receiving fin 58 as viewed from the +Z direction intersects the rotation axis Rx passing through the center of the second surface 522 of the phosphor wheel 51.

As shown in FIG. 5, the heat receiving fin 58 includes a plurality of second fins 581 provided between the heat receiving surface 571 of the heat receiving plate 57 and the heat dissipating fin 55 in a direction along the rotation axis Rx. In the embodiment, the plurality of second fins 581 correspond to a plurality of heat receiving plate side fins.

As shown in FIGS. 6 and 7, the plurality of second fins 581 are arranged in the circumferential direction around the rotation axis Rx. Each of the plurality of second fins 581 is fixed in contact with the heat receiving surface 571 and stands from the heat receiving surface 571. That is, each of the plurality of second fins 581 is coupled to the heat receiving surface 571 so as to be able to transfer heat.

Each of the plurality of second fins 581 extends from a portion on the rotation axis Rx side toward the peripheral wall 311. Specifically, each of the plurality of second fins 581 extends linearly so as to be inclined clockwise toward the outer peripheral edge of the heat receiving fin 58 as viewed from the +Z direction.

Gaps through which the airflow can flow are formed between fins of the plurality of second fins 581. Therefore, the airflow that flows toward the outside of the phosphor wheel 51 with the rotation of the phosphor wheel 51 and is turned back at the peripheral wall 311 flows through the plurality of second fins 581 and flows toward the rotation axis Rx side along the plurality of second fins 581. That is, the airflow circulating from the phosphor wheel 51 to the phosphor wheel 51 via the peripheral wall 311 and the heat receiving plate 57 flows between the fins of the plurality of second fins 581. The plurality of second fins 581 receive heat from the airflow flowing between the fins and transfer the received heat to the heat receiving plate 57. Accordingly, the airflow flowing through a central portion of the second surface 522 of the phosphor wheel 51 that becomes a negative pressure is cooled.

Configuration of Thermoelectric Conversion Element

The thermoelectric conversion element 59 shown in FIG. 5 is disposed between the heat receiving plate 57 and the heat dissipating device 60, and transports the heat transferred from the heat receiving plate 57 to the heat dissipating device 60.

The thermoelectric conversion element 59 has a first surface 591 coupled to the heat dissipating surface 572 of the heat receiving plate 57 and a second surface 592 coupled to a heat sink 601 of the heat dissipating device 60. The first surface 591 and the second surface 592 are opposite-side surfaces of the thermoelectric conversion element 59 from each other.

In the embodiment, the thermoelectric conversion element 59 is implemented by a Peltier element. In the thermoelectric conversion element 59 that is the Peltier element, the first surface 591 functions as a heat absorbing surface, and the second surface 592 functions as a heat dissipating surface. The first surface 591 of the thermoelectric conversion element 59 actively absorbs heat from the heat receiving plate 57 and dissipates the heat to the heat dissipating device 60 via the second surface 592.

The thermoelectric conversion element 59 may be omitted as long as heat transfer from the heat receiving plate 57 to the heat dissipating device 60 is good. In this case, the heat dissipating device 60 is coupled to the heat dissipating surface 572 of the heat receiving plate 57 so as to be able to transfer heat.

Configuration of Heat Dissipating Device

Figure 8:
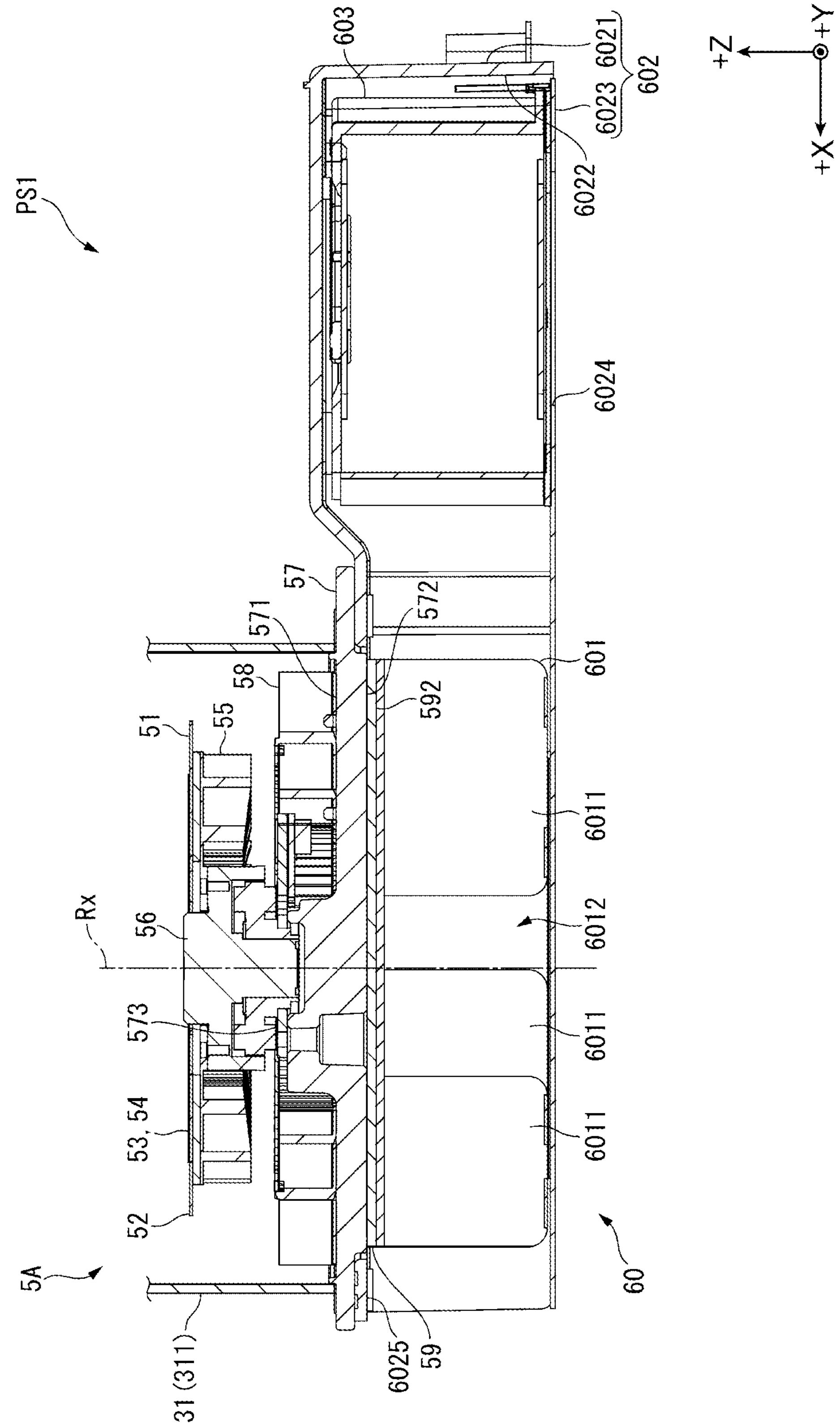
FIG. 8 is a cross-sectional view showing a heat dissipating device according to the first embodiment.

FIG. 8 is a cross-sectional view of the heat dissipating device 60 taken along an XZ plane.

The heat dissipating device 60 is provided on an opposite side from the phosphor wheel 51 with respect to the heat receiving plate 57. The heat dissipating device 60 dissipates the heat transferred from the heat receiving plate 57 via the thermoelectric conversion element 59 to the outside of the light source housing 31. As shown in FIG. 8, the heat dissipating device 60 includes the heat sink 601, a duct 602, and a cooling fan 603.

Configuration of Heat Sink

Figure 9:
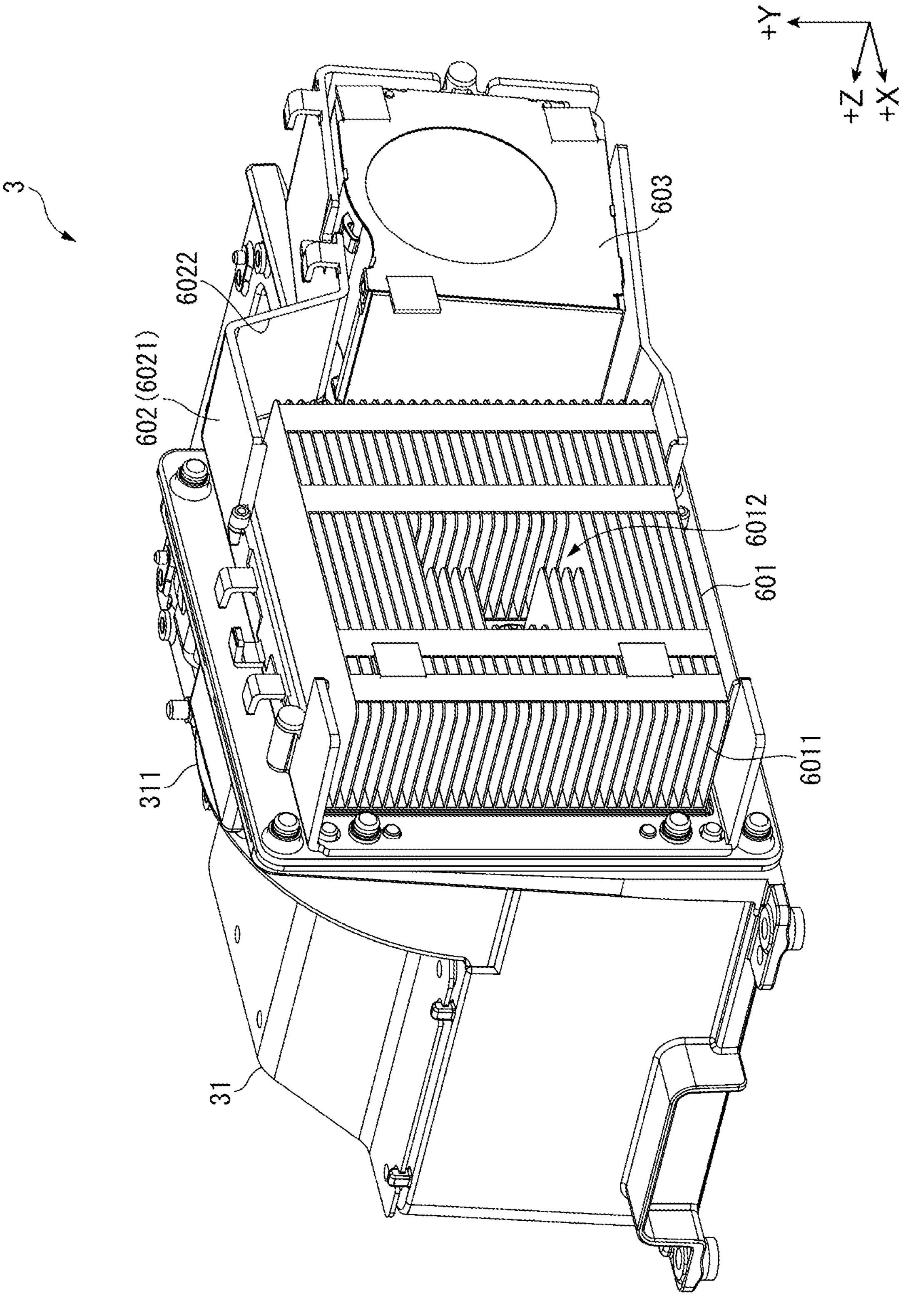
FIG. 9 is a perspective view showing the light source device with a cover member according to the first embodiment removed.

FIG. 9 is a perspective view showing the light source device 3 with a cover member 6023 constituting the duct 602 removed. In FIG. 9, only some of a plurality of fins 6011 are denoted by reference numerals.

As shown in FIGS. 5 and 8, the heat sink 601 is coupled to the second surface 592 of the thermoelectric conversion element 59 so as to be able to transfer heat, and is provided in the duct 602 as shown in FIGS. 8 and 9. The heat sink 601 transfers the heat transferred from the heat receiving plate 57 via the thermoelectric conversion element 59 to a cooling gas flowing through the duct 602.

The heat sink 601 includes the plurality of fins 6011 extending along a flow direction of the cooling gas flowing through the duct 602. Specifically, as shown in FIG. 9, the plurality of fins 6011 each extend along the +X direction and are disposed side by side in the +Y direction. The cooling gas flowing through the duct 602 by the cooling fan 603 flows through the fins 6011, and the fins 6011 transfer the transferred heat of the phosphor wheel 51 to the cooling gas.

A recess 6012 formed at a center of the heat sink 601 is a portion for arranging a screw (not shown) for fixing the rotation device 56 to the heat receiving plate 57.

Configuration of Duct

As shown in FIG. 8, the duct 602 accommodates the cooling fan 603 and the heat sink 601, and allows the cooling gas flowing due to the cooling fan 603 to flow toward the heat sink 601. The duct 602 includes a duct body 6021 and a cover member 6023.

The duct body 6021 is coupled to the heat receiving plate 57. The duct body 6021 has an opening 6022 that opens in the −Z direction. The duct body 6021 is made of a material having good thermal conductivity, and the duct body 6021 dissipates a part of the heat transferred from the heat receiving plate 57.

The cover member 6023 is a plate-shaped body that is attached to the duct body 6021 and closes the opening 6022. An introduction port 6024 that introduces gas outside the duct 602 into the duct 602 is provided in a portion of the cover member 6023 in the −X direction.

The duct 602 has a discharge port 6025 formed by combining the duct body 6021 and the cover member 6023 at an end in the +X direction.

Configuration of Cooling Fan

As shown in FIGS. 8 and 9, the cooling fan 603 is disposed in the duct 602, sucks the gas outside the duct 602 through the introduction port 6024 shown in FIG. 8, and sends out the gas as cooling gas into the duct 602. The cooling gas sent out from the cooling fan 603 in the +X direction flows between fins of the plurality of fins 6011, and then is discharged to the outside of the duct 602 through the discharge port 6025. The cooling fan 603 may be disposed on a downstream side rather than an upstream side in a flow path of the cooling gas flowing through the heat sink 601.

Airflow and Heat Transport in Phosphor Unit

Figure 10:
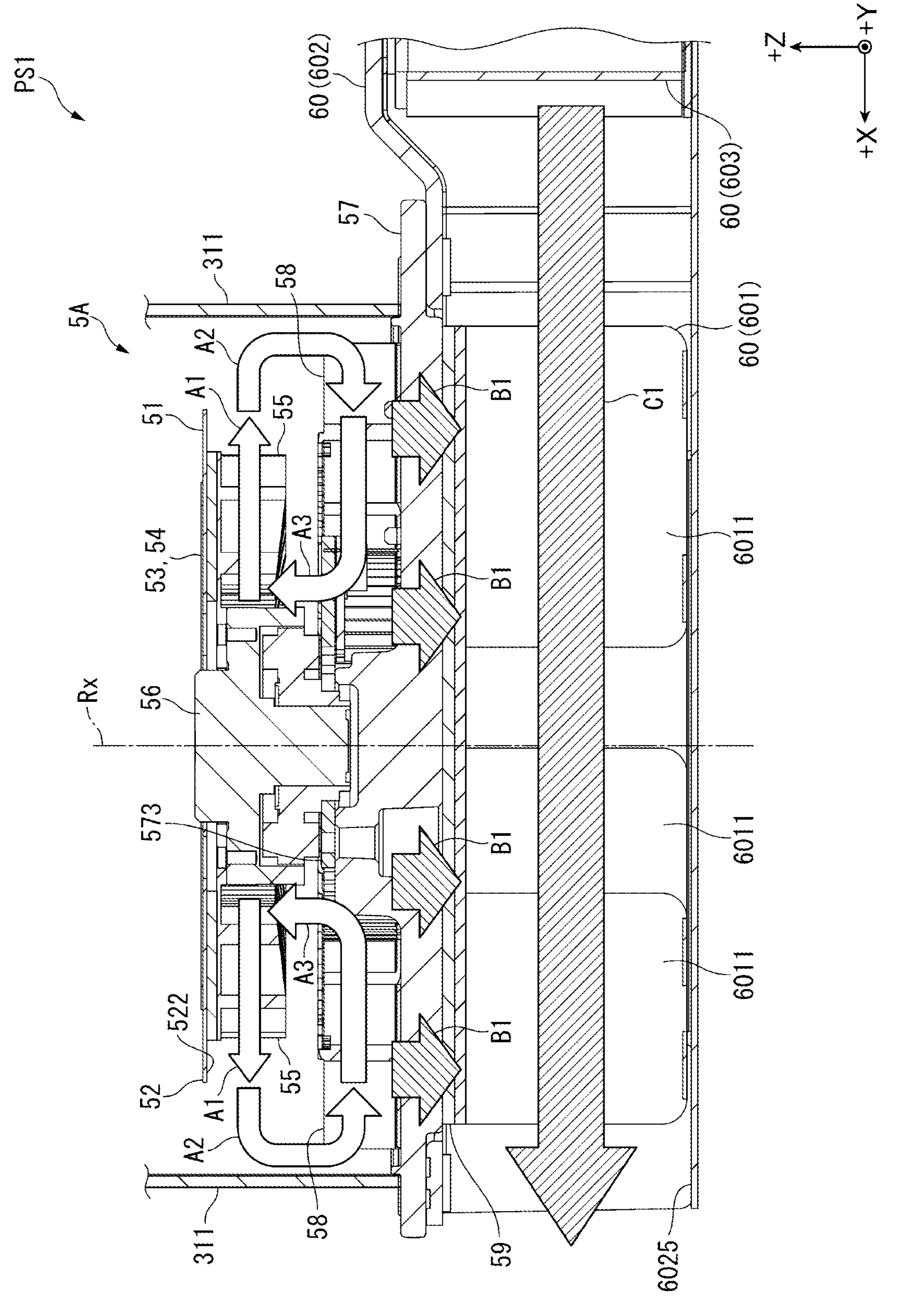
FIG. 10 is a cross-sectional view showing a phosphor unit according to the first embodiment.

FIG. 10 is a view showing a cross section of the phosphor unit PS1 as viewed from the −Z direction, and is a view showing a flow direction of an airflow in the phosphor unit PS1 and a transfer direction of heat generated in the phosphor wheel 51.

When the phosphor wheel 51 is rotated by the rotation device 56, as indicated by an arrow A1 in FIG. 10, an airflow flowing toward the outside of the phosphor wheel 51 is generated by the heat dissipating fin 55. Since the heat dissipating fin 55 transfers the heat transferred from the wavelength conversion portion 53 via the substrate 52 to the airflow flowing between the fins of the plurality of first fins 551, the airflow that flowed from the heat dissipating fin 55 toward the outside of the phosphor wheel 51 is heated by the heat dissipating fin 55.

The airflow discharged to the outside of the phosphor wheel 51 is turned back at an inner surface of the peripheral wall 311 as indicated by an arrow A2, and flows toward the heat receiving plate 57 facing the second surface 522. Since the heat receiving plate 57 is provided with the heat receiving fin 58, the airflow turned back at the peripheral wall 311 flows between the fins of the plurality of second fins 581 constituting the heat receiving fin 58 toward the rotation axis Rx side as indicated by an arrow A3. The airflow thus flowing is heated and cooled by the plurality of second fins 581. The airflow that flowed toward the rotation axis Rx side is sucked again by the rotating phosphor wheel 51, and flows out toward the outside of the phosphor wheel 51 via the heat dissipating fin 55 as indicated by the arrow A1.

On the other hand, the heat received by the heat receiving fin 58 is transferred from the heat receiving fin 58 to the heat receiving plate 57 as indicated by an arrow B1, and then transferred to the heat sink 601 of the heat dissipating device 60 via the thermoelectric conversion element 59.

The cooling gas flows through the heat sink 601 by the cooling fan 603 as indicated by an arrow Cl. The cooling gas, to which the heat is transferred by the heat sink 601, is discharged to the outside of the duct 602 through the discharge port 6025, and further to the outside of the light source housing 31.

Accordingly, the heat generated in the wavelength conversion portion 53 of the phosphor wheel 51 is discharged to the outside of the light source housing 31, and a temperature in the light source housing 31, that is, a temperature of the wavelength conversion portion 53 is maintained low.

Effects of First Embodiment

The projector 1 according to the embodiment described above has the following effects.

The projector 1 includes the light source device 3, the light modulation elements 243 that modulate light from the light source device 3 into image light, and the projection optical device 26 that projects the image light.

The light source device 3 includes the phosphor unit PS1 and the solid-state light emitting element 321 that emits the blue light BLs as excitation light incident on the phosphor unit PS1. When the blue light BLs is incident on the phosphor unit PS1, the phosphor unit PS1 emits light containing the fluorescence YL obtained by converting a wavelength of the blue light BLs.

The phosphor unit PS1 includes the phosphor wheel 51, the peripheral wall 311, the heat receiving plate 57, and the heat receiving fin 58.

The phosphor wheel 51 rotates around the rotation axis Rx. The phosphor wheel 51 includes the substrate 52, the wavelength conversion portion 53, and the heat dissipating fin 55.

The substrate 52 includes the first surface 521 and the second surface 522 provided on an opposite side from the first surface 521 and facing the heat receiving plate 57. The substrate 52 rotates around the rotation axis Rx.

The wavelength conversion portion 53 is disposed on the first surface 521, and includes the phosphor that converts the wavelength of the incident light.

The heat dissipating fin 55 is disposed on the second surface 522. The heat dissipating fin 55 includes the plurality of first fins 551 that generate an airflow in a direction from a center of the second surface 522 toward the outside by the rotation of the substrate 52 and dissipate heat transferred from the wavelength conversion portion 53 to the generated airflow.

The peripheral wall 311 surrounds the phosphor wheel 51 along the circumferential direction around the rotation axis Rx.

The heat receiving plate 57 is disposed intersecting the rotation axis Rx on the rotation axis Rx, facing the phosphor wheel 51, and spaced apart from phosphor wheel 51.

The heat receiving fin 58 is fixed to the heat receiving plate 57 and surrounded by the peripheral wall 311. The heat receiving fin 58 includes the plurality of second fins 581.

The airflow circulating from the phosphor wheel 51 to the phosphor wheel 51 via the peripheral wall 311 and the heat receiving plate 57 flows through the plurality of second fins 581. The plurality of second fins 581 receive heat from the flowing airflow and transfer the heat to the heat receiving plate 57.

According to such a configuration, the phosphor provided in the wavelength conversion portion 53 generates heat when converting the wavelength of the incident light. A part of the heat generated by the phosphor is transferred to the substrate 52, and a part of the heat transferred to the substrate 52 is transferred to the heat dissipating fin 55 via the substrate 52.

When the substrate 52 rotates, a gas around the first surface 521 of the substrate 52 flows through the wavelength conversion portion 53 to cool the wavelength conversion portion 53.

When the substrate 52 rotates, an airflow in a direction from the center of the second surface 522 toward the outside is generated by the heat dissipating fin 55 provided on the second surface 522. When the generated airflow flows between the fins of the plurality of first fins 551, the heat transferred from the wavelength conversion portion 53 to the plurality of first fins 551 via the substrate 52 is transferred to the airflow. Accordingly, the wavelength conversion portion 53 is further cooled.

The airflow that flowed through the heat dissipating fin 55 is turned back at the peripheral wall 311 surrounding the phosphor wheel 51, and flows toward the center of the second surface 522 that becomes a negative pressure due to the rotation of the substrate 52. That is, the airflow that flowed toward the outside of the phosphor wheel 51 circulates to the center of the second surface 522 via the peripheral wall 311 and the heat receiving plate 57. The circulating airflow flows between the fins of the plurality of second fins 581 of the heat receiving fin 58 fixed to the heat receiving plate 57, and the plurality of second fins 581 receive heat from the airflow. The heat received by the plurality of second fins 581 is transferred to the heat receiving plate 57, and the heat receiving plate 57 also receives the heat from the airflow. Accordingly, the airflow flowing toward the center of the second surface 522 is cooled. Then, the cooled airflow flows through the heat dissipating fin 55 again in a process of flowing from a region on a center side of the second surface 522 toward the outside.

In this way, a temperature of the airflow flowing through the heat dissipating fin 55 can be maintained low by the heat receiving fin 58 fixed to the heat receiving plate 57, and thus cooling efficiency of the wavelength conversion portion 53 can be improved. The airflow flows through a space surrounded by the phosphor wheel 51, the peripheral wall 311, and the heat receiving plate 57 to cool the heat dissipating fin 55. Therefore, a cooling structure of the wavelength conversion portion 53 can be implemented to be compact.

In addition, since a cooling effect of the wavelength conversion portion 53 is high, an amount of the excitation light incident on the wavelength conversion portion 53 can be increased. Therefore, it is possible to implement the light source device 3 that emits a large amount of light and to implement the projector 1 capable of projecting the image light having high luminance.

In the phosphor unit PS1, each of the plurality of second fins 581 stands from the heat receiving plate 57. Each of the plurality of second fins 581 extends from a portion on the rotation axis Rx side toward the peripheral wall 311. In other words, each of the plurality of second fins 581 extends from an outer peripheral edge of the heat receiving fin 58 toward the rotation axis Rx.

According to such a configuration, the plurality of second fins 581 can be disposed along a flow direction of the airflow circulating in the space surrounded by the phosphor wheel 51, the peripheral wall 311, and the heat receiving plate 57. Accordingly, the airflow can easily flow between the fins of the plurality of second fins 581, and the heat of the airflow can be easily received by the second fins 581. Therefore, efficiency of heat transfer from the airflow to the heat receiving fin 58 can be improved.

In the phosphor unit PS1, the plurality of second fins 581 correspond to a plurality of heat receiving plate side fins disposed between the heat receiving plate 57 and the heat dissipating fin 55 in the direction along the rotation axis Rx. The airflow that flowed from the heat dissipating fin 55 toward the outside of the phosphor wheel 51 is turned back at the peripheral wall 311 and then flows through the plurality of second fins 581, and the plurality of second fins 581 allow the airflow turned back at the peripheral wall 311 to flow toward the rotation axis Rx side.

According to such a configuration, the plurality of second fins 581 can receive the heat from the airflow flowing toward the outside from the heat dissipating fin 55 and turned back at the peripheral wall 311. Therefore, it is possible to cool the phosphor wheel 51 by transferring the heat of the airflow to the heat receiving plate 57 while circulating the airflow.

In the phosphor unit PS1, the heat receiving plate 57 is formed of a vapor chamber.

According to such a configuration, the heat transferred from the heat dissipating fin 55 to the heat receiving plate 57 via the airflow and the heat receiving fin 58 is diffused to the entire heat receiving plate 57 that is the vapor chamber. Therefore, heat can be prevented from being locally transferred from the heat receiving plate 57 to the heat dissipating device 60, and heat can be efficiently transferred from the heat receiving plate 57 to the heat dissipating device 60. Therefore, heat can be efficiently dissipated by the heat dissipating device 60.

The phosphor unit PS1 includes the heat dissipating device 60 that is provided on an opposite side from the phosphor wheel 51 with respect to the heat receiving plate 57 and dissipates heat transferred to the heat receiving plate 57.

According to such a configuration, since the heat of the wavelength conversion portion 53 transferred to the heat receiving plate 57 can be dissipated by the heat dissipating device 60, the heat of the wavelength conversion portion 53 can be quickly dissipated. Therefore, cooling efficiency of the wavelength conversion portion 53 can be improved.

The phosphor unit PS1 includes the thermoelectric conversion element 59 provided between the heat receiving plate 57 and the heat dissipating device 60.

According to such a configuration, heat transfer from the heat receiving plate 57 to the heat dissipating device 60 can be assisted by the thermoelectric conversion element 59. Therefore, efficiency of heat transfer from the heat receiving plate 57 to the heat dissipating device 60 can be improved, and consequently, efficiency of dissipating heat of the wavelength conversion portion 53 by the heat dissipating device 60 can be improved.

In the phosphor unit PS1, the heat dissipating device 60 includes the heat sink 601.

According to such a configuration, the heat transferred to the heat receiving plate 57 is dissipated by the heat sink 601. Therefore, the heat dissipating device 60 can be implemented by a relatively simple configuration.

Second Embodiment

Next, a second embodiment of the present disclosure will be described.

A projector according to the embodiment has the same configuration as the projector 1 according to the first embodiment, but a configuration of a heat receiving fin provided in a phosphor unit is different. In the following description, portions that are the same as or substantially the same as portions already described are denoted by the same reference numerals, and description thereof will be omitted.

General Configuration of Projector

Figure 11:
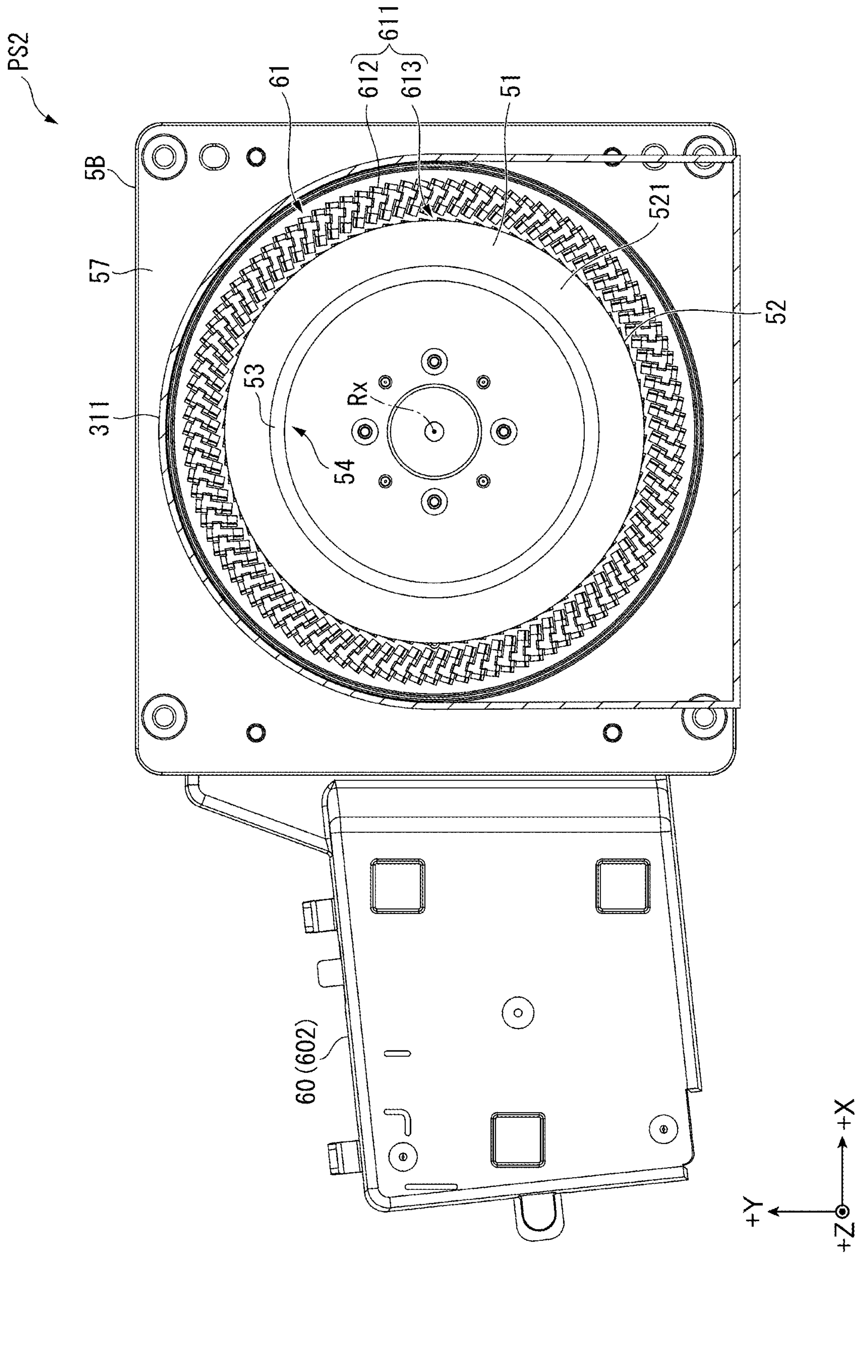
FIG. 11 is a cross-sectional view showing a phosphor unit provided in a projector according to a second embodiment.

FIG. 11 is a cross-sectional view showing a phosphor unit PS2 according to the present embodiment.

The projector according to the embodiment has the same configuration and function as the projector 1 according to the first embodiment except that the phosphor unit PS2 shown in FIG. 11 is provided instead of the phosphor unit PS1 according to the first embodiment. That is, the light source device 3 according to the embodiment has the same configuration and function as the light source device 3 according to the first embodiment except that the phosphor unit PS2 is provided instead of the phosphor unit PS1 according to the first embodiment.

Configuration of Phosphor Unit

The phosphor unit PS2 has the same configuration and function as the phosphor unit PS1 according to the first embodiment except that a heat receiving fin 61 shown in FIG. 11 is provided instead of the heat receiving fin 58 according to the first embodiment. Specifically, the phosphor unit PS2 includes a peripheral wall 311 of the light source housing 31 and a wavelength conversion device 5B. The wavelength conversion device 5B includes the phosphor wheel 51, the heat receiving plate 57, the heat receiving fin 61, and the heat dissipating device 60 as shown in FIG. 11, and further includes the rotation device 56 and the thermoelectric conversion element 59, which are not shown in FIG. 11.

Configuration of Heat Receiving Fin

Figure 12:
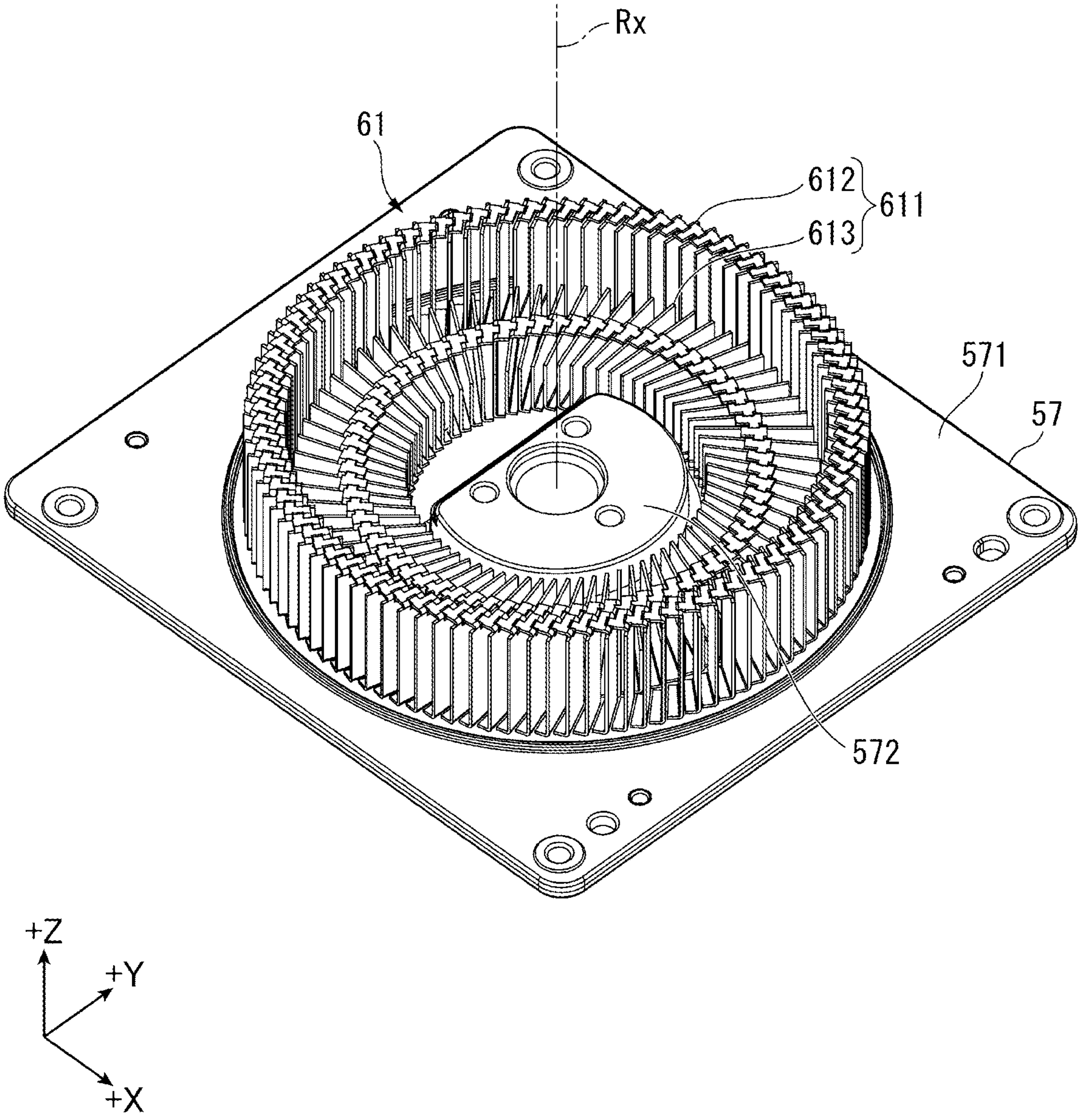
FIG. 12 is a perspective view showing a heat receiving fin according to the second embodiment.
Figure 13:
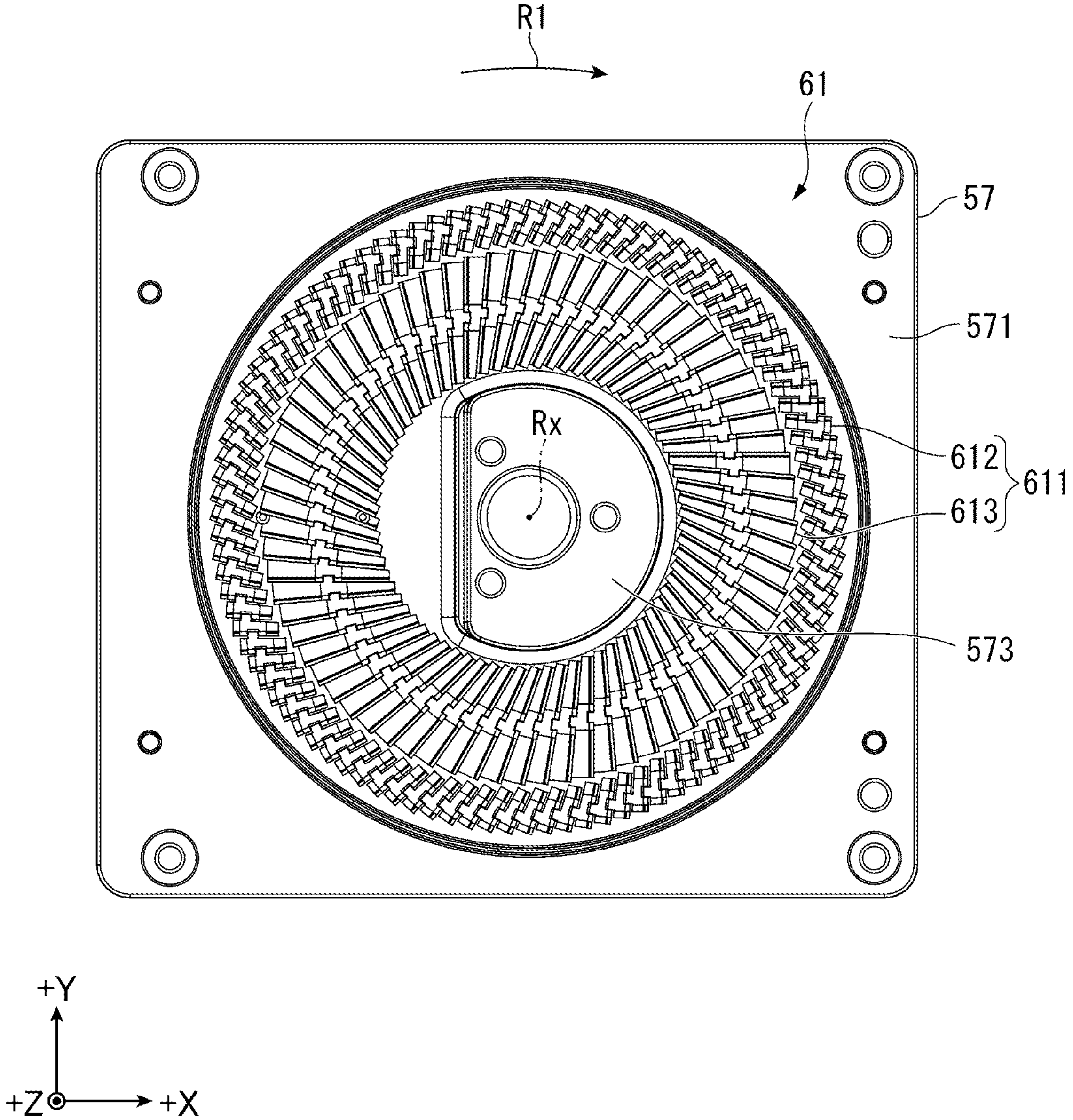
FIG. 13 is a plan view showing the heat receiving fin according to the second embodiment.

FIG. 12 is a perspective view showing the heat receiving fin 61 provided in the phosphor unit PS2. FIG. 13 is a plan view showing the heat receiving fin 61 viewed from the +Z direction. In FIGS. 12 and 13, only some of a plurality of second fins 611 constituting the heat receiving fin 61 are denoted by reference numerals, and only some of a plurality of peripheral wall side fins 612 and some of a plurality of heat receiving plate side fins 613 constituting the second fins 611 are denoted by reference numerals.

As shown in FIGS. 12 and 13, the heat receiving fin 61 is provided to be able to transfer heat to the heat receiving plate 57. The heat receiving fin 61 includes the plurality of second fins 611 that receive heat from an airflow after flowing through the heat dissipating fin 55 of the phosphor wheel 51 and transfer the received heat to the heat receiving plate 57.

Each of the plurality of second fins 611 stands from the heat receiving plate 57 and extends from a portion on the rotation axis Rx side toward the peripheral wall 311. The plurality of second fins 611 are arranged in a circumferential direction around the rotation axis Rx of the phosphor wheel 51.

The plurality of second fins 611 include the plurality of peripheral wall side fins 612 and the plurality of heat receiving plate side fins 613. In the embodiment, the peripheral wall side fins 612 and the heat receiving plate side fins 613 are separated.

Configuration of Peripheral Wall Side Fins

Figure 14:
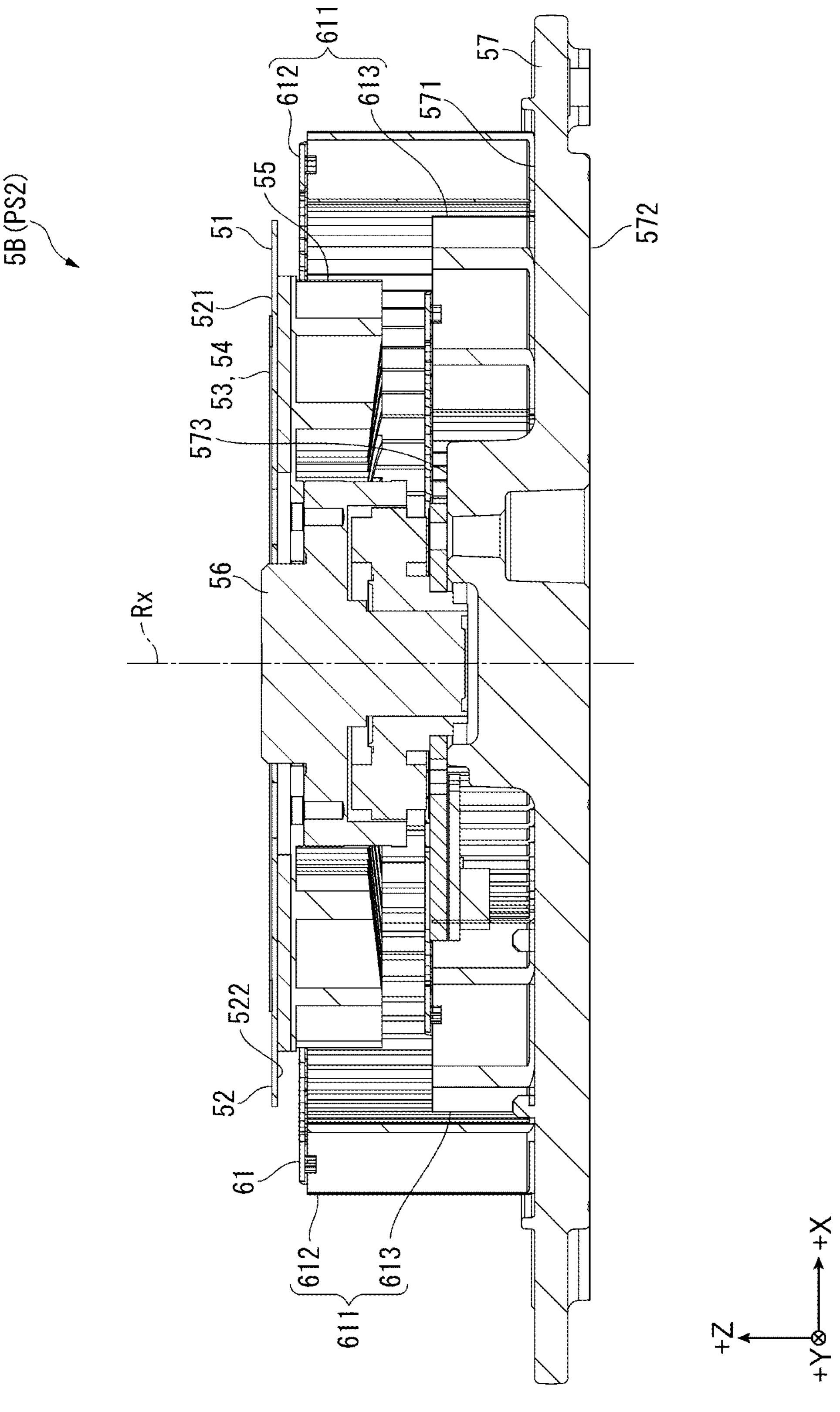
FIG. 14 is a cross-sectional view showing a wavelength conversion device according to the second embodiment.

FIG. 14 is a cross-sectional view showing the wavelength conversion device 5B along the XZ plane. In other words, FIG. 14 is a view showing positions of the peripheral wall side fins 612 and a position of the heat dissipating fin 55 in the +Z direction. In FIG. 14, the thermoelectric conversion element 59 and the heat dissipating device 60 are not shown.

As shown in FIG. 11, the plurality of peripheral wall side fins 612 are provided between the phosphor wheel 51 and the peripheral wall 311 as viewed from the +Z direction. That is, the plurality of peripheral wall side fins 612 are provided between the phosphor wheel 51 and the peripheral wall 311 in a direction orthogonal to the rotation axis Rx. As shown in FIG. 14, the plurality of peripheral wall side fins 612 stand in the +Z direction from the heat receiving plate 57, and end portions of the peripheral wall side fins 612 in the +Z direction are disposed in the +Z direction with respect to an end portion of the heat dissipating fin 55 in the −Z direction. That is, the peripheral wall side fins 612 and the heat dissipating fin 55 are disposed to overlap each other in the direction orthogonal to the rotation axis Rx.

As shown in FIGS. 11 and 13, the plurality of peripheral wall side fins 612 are arranged in the circumferential direction around the rotation axis Rx. Each of the plurality of peripheral wall side fins 612 extends linearly so as to be inclined clockwise from an end portion on the rotation axis Rx side toward the peripheral wall 311 as viewed from the +Z direction. That is, each of the plurality of peripheral wall side fins 612 extends linearly so as to be inclined in the R1 direction, which is a rotation direction of the phosphor wheel 51, from the end portion on the rotation axis Rx side toward the peripheral wall 311 side.

An airflow generated by the rotation of the phosphor wheel 51 flows through the peripheral wall side fins 612. Specifically, in a region of the peripheral wall side fins 612 in the +Z direction, an airflow before reaching the peripheral wall 311 among airflows flowing toward the outside from the phosphor wheel 51 flows.

In a region of the peripheral wall side fins 612 in the −Z direction, an airflow turned back at the peripheral wall 311 flows. Therefore, in the peripheral wall side fins 612, a flow direction of the airflow flowing through the region in the +Z direction and a flow direction of the airflow flowing through the region in the −Z direction are opposite to each other.

The peripheral wall side fins 612 receive heat from the circulating airflow and transfer the received heat to the heat receiving plate 57.

Figure 15:
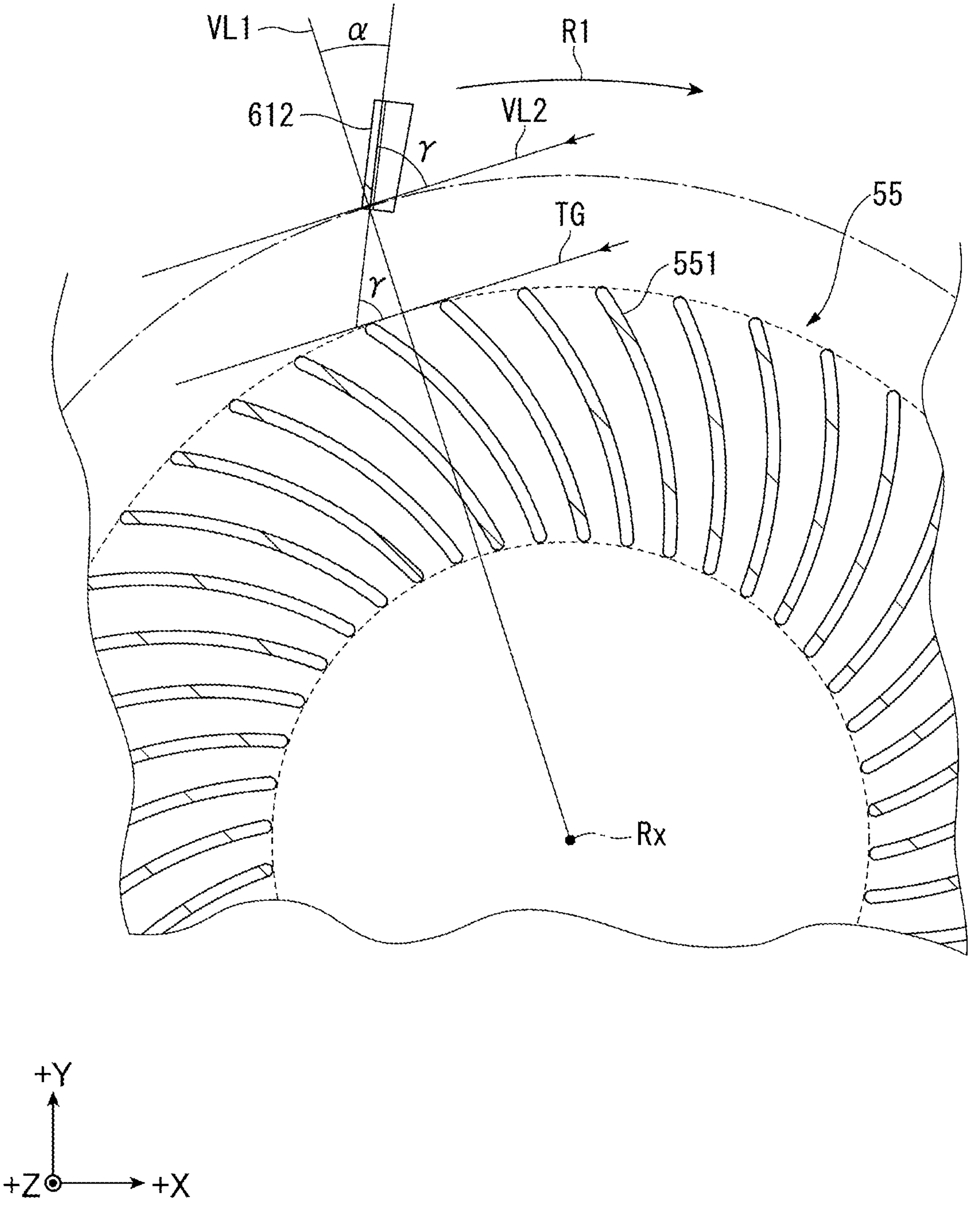
FIG. 15 is a cross-sectional view showing a heat dissipating fin and a peripheral wall side fin according to the second embodiment.

FIG. 15 is a cross-sectional view showing the heat dissipating fin 55 and the peripheral wall side fin 612 along a plane orthogonal to the +Z direction. In other words, FIG. 15 is a view showing an extending direction of the peripheral wall side fin 612.

Here, as described above, each of the first fins 551 constituting the heat dissipating fin 55 extends while being curved in an opposite direction from the R1 direction from an end portion on the rotation axis Rx side toward the outside of the substrate 52. Therefore, an airflow passing between fins of the first fins 551 flows from an outer peripheral edge of the phosphor wheel 51 in a radial shape around the rotation axis Rx, and flows in a winding manner in the R1 direction.

Meanwhile, as shown in FIG. 15, each of the peripheral wall side fins 612 extends to be inclined in the R1 direction with respect to a virtual line VL1 coupling an inner peripheral side end portion of the peripheral wall side fin 612 and the rotation axis Rx. The inner peripheral side end portion of the peripheral wall side fin 612 is an end portion of the peripheral wall side fin 612 on the rotation axis Rx side. In other words, each of the peripheral wall side fins 612 extends to be inclined in an opposite direction from the rotation direction of the phosphor wheel 51 with respect to a tangent line on an outer peripheral edge of the phosphor wheel 51 on the virtual line VL1 coupling the inner peripheral side end portion of the peripheral wall side fin 612 and the rotation axis Rx.

In the embodiment, an angle $\alpha$ formed by the virtual line VL1 and an extending direction of one peripheral wall side fin 612 is set to $0° \leq \alpha < 90°$. That is, an intersection angle $\gamma$ between a tangent line TG of the outer peripheral edge of the phosphor wheel 51 located on the virtual line VL1 coupling the inner peripheral side end portion of one peripheral wall side fin 612 and the rotation axis Rx, and an extending direction of the one peripheral wall side fin 612 is set to $0° < \gamma \leq 90°$. In other words, the intersection angle $\gamma$ between a virtual line VL2 parallel to the tangent line TG and passing through the inner peripheral side end portion of the one peripheral wall side fin 612, and the extending direction of the one peripheral wall side fin 612 is set to $0° < \gamma \leq 90°$.

More specifically, the plurality of peripheral wall side fins 612 are disposed such that the intersection angle $\gamma$ satisfies $35° \leq \gamma \leq 85°$, preferably $40° < \gamma \leq 70°$.

These ranges are based on the following experimental results.

Figure 16:
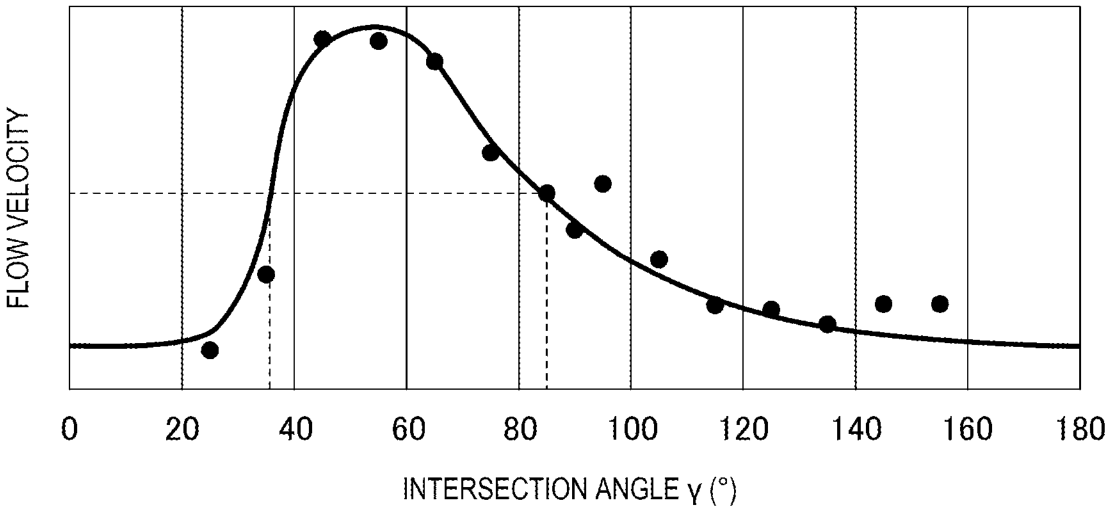
FIG. 16 is a graph showing a relationship between an intersection angle γ and a flow velocity of an airflow passing through a plurality of peripheral wall side fins and flowing through the heat receiving fin toward a peripheral wall according to the second embodiment.

FIG. 16 is a graph showing a relationship between the intersection angle $\gamma$ and a flow velocity of an airflow passing through the plurality of peripheral wall side fins 612 and flowing toward the peripheral wall 311.

A surface temperature of the wavelength conversion portion 53 can be maintained low by allowing an airflow having a low temperature to smoothly flow through the heat dissipating fin 55. That is, by reducing a flow path resistance when the airflow generated by rotation of the phosphor wheel 51 passes through the plurality of peripheral wall side fins 612, the airflow can be smoothly circulated, and the surface temperature of the wavelength conversion portion 53 can be maintained low. In the present disclosure, based on such knowledge, an experiment was performed in which a plurality of phosphor units PS2 including the plurality of peripheral wall side fins 612 having different intersection angles $\gamma$ were provided, and a flow velocity of an airflow passing through the plurality of peripheral wall side fins 612 when the phosphor wheel 51 was rotated was measured. The results of such an experiment are shown in FIG. 16.

A rotation speed per unit time of the phosphor wheel 51 in the experiment is 6000 rpm. The rotation speed is a rotation speed in consideration of cooling efficiency of the phosphor wheel 51, and is a rotation speed in consideration of a case where the rotation speed per unit time of the phosphor wheel 51 coincides with a driving frequency of the light modulation element 243 and flicker occurs.

According to the experimental results in FIG. 16, it was found that the flow velocity of the airflow passing through the plurality of peripheral wall side fins 612 and flowing toward the peripheral wall 311 can be maintained high when the intersection angle $\gamma$ satisfies $35° \leq \gamma \leq 85°$, and the flow velocity of the airflow can be maintained even higher when the intersection angle $\gamma$ satisfies $40° \leq \gamma \leq 70°$.

Figure 17:
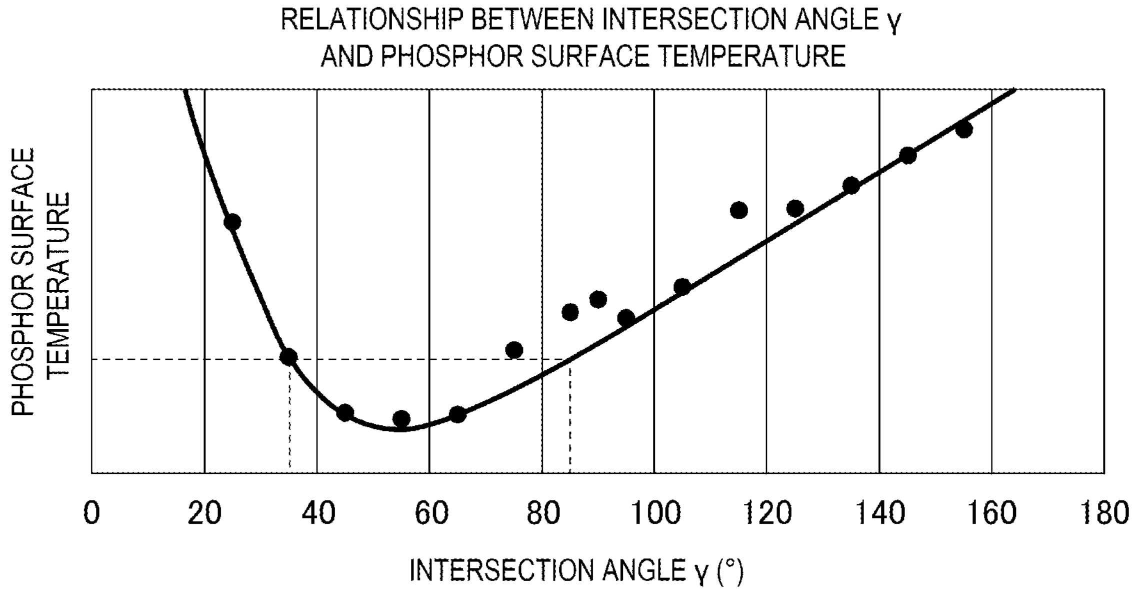
FIG. 17 is a graph showing a relationship between the intersection angle γ and a surface temperature of a wavelength conversion portion according to the second embodiment.

FIG. 17 is a graph showing a relationship between the intersection angle $\gamma$ and the surface temperature of the wavelength conversion portion 53.

In the present disclosure, an experiment was performed in which the plurality of phosphor units PS2 including the plurality of peripheral wall side fins 612 having different intersection angles $\gamma$ were provided, and a surface temperature of the wavelength conversion portion 53 when excitation light was incident on the rotating phosphor wheel 51 was measured. The results of such an experiment are shown in FIG. 17. A rotation speed per unit time of the phosphor wheel 51 in the experiment is 6000 rpm as in the above-described experiment.

According to the experimental results in FIG. 17, it is found that the surface temperature of the wavelength conversion portion 53 can be maintained low when the intersection angle $\gamma$ satisfies $35° \leq \gamma \leq 85°$, and the surface temperature of the wavelength conversion portion 53 can be maintained even lower when the intersection angle $\gamma$ satisfies $40° \leq \gamma \leq 70°$.

From these experimental results, in the heat receiving fin 61 according to the embodiment, the plurality of peripheral wall side fins 612 are disposed such that the intersection angle $\gamma$ satisfies $35° \leq \gamma \leq 85°$, and cooling efficiency of the wavelength conversion portion 53 is improved accordingly.

Configuration of Heat Receiving Plate Side Fins

As shown in FIG. 14, the plurality of heat receiving plate side fins 613 are provided between the heat receiving plate 57 and the heat dissipating fin 55 in the direction along the rotation axis Rx. As shown in FIGS. 12 to 14, the plurality of heat receiving plate side fins 613 are provided in a region on the rotation axis Rx side with respect to the plurality of peripheral wall side fins 612 as viewed from the +Z direction.

The plurality of heat receiving plate side fins 613 have the same configuration and function as the plurality of second fins 581. That is, each of the plurality of heat receiving plate side fins 613 extends from a portion on the rotation axis Rx side toward the peripheral wall 311, and extends linearly so as to be inclined clockwise toward the peripheral wall 311. That is, each of the plurality of heat receiving plate side fins 613 extends linearly so as to be inclined in the R1 direction from an end portion on the rotation axis Rx side toward the peripheral wall 311. The plurality of heat receiving plate side fins 613 are arranged in a circumferential direction around the rotation axis Rx.

An airflow that is turned back at the peripheral wall 311 and passed through the plurality of peripheral wall side fins 612 flows through the heat receiving plate side fins 613, and the plurality of heat receiving plate side fins 613 allow the airflow to flow toward the rotation axis Rx side. The heat receiving plate side fins 613 receive heat from the flowing airflow and transfer the received heat to the heat receiving plate 57.

Here, as shown in FIG. 13, an inter-fin pitch of the plurality of peripheral wall side fins 612 arranged in the circumferential direction around the rotation axis Rx is different from an inter-fin pitch of the plurality of heat receiving plate side fins 613 arranged in the circumferential direction. More specifically, the inter-fin pitch of the plurality of peripheral wall side fins 612 is smaller than the inter-fin pitch of the plurality of the heat receiving plate side fins 613. In the embodiment, the inter-fin pitch of the plurality of peripheral wall side fins 612 arranged in the circumferential direction is 3.6°, whereas the inter-fin pitch of the plurality of heat receiving plate side fins 613 arranged in the circumferential direction is 5.0°.

Since the plurality of peripheral wall side fins 612 and the plurality of heat receiving plate side fins 613 are arranged at such inter-fin pitches, the plurality of peripheral wall side fins 612 having a large dimension between an outer peripheral edge and the rotation axis Rx can be disposed more densely than the plurality of heat receiving plate side fins 613 having a small dimension between an outer peripheral edge and the rotation axis Rx. Therefore, a smooth flow of the airflow is implemented while increasing a contact area with the airflow in the fins 612 and 613.

Effects of Second Embodiment

The projector according to the embodiment described above has the following effects in addition to the same effects as the projector 1 according to the first embodiment.

In the phosphor unit PS1, the plurality of second fins 611 include the plurality of peripheral wall side fins 612 disposed between the phosphor wheel 51 and the peripheral wall 311 in the direction orthogonal to the rotation axis Rx. The plurality of peripheral wall side fins 612 allow an airflow that flowed toward the outside of the phosphor wheel 51 to flow to the peripheral wall 311 via the peripheral wall side fins 612 on a phosphor wheel 51 side. Then, the peripheral wall 311 turns back the airflow and allows the airflow to flow to the peripheral wall side fins 612 on a heat receiving plate 57 side. The peripheral wall side fins 612 on the phosphor wheel 51 side indicate portions of the peripheral wall side fins 612 in the +Z direction, and the peripheral wall side fins 612 on the heat receiving plate 57 side indicate portions of the peripheral wall side fins 612 in the −Z direction.

According to such a configuration, it is possible to efficiently receive heat from the airflow that flowed through the heat dissipating fin 55 using all of the plurality of peripheral wall side fins 612 standing from the heat receiving plate 57, and to reduce a temperature of the airflow flowing through the heat dissipating fin 55. Therefore, the cooling efficiency of the phosphor wheel 51 can be improved.

By the plurality of peripheral wall side fins 612, the airflow circulating among the phosphor wheel 51, the peripheral wall 311 and the heat receiving plate 57 can be smoothly circulated.

In the phosphor unit PS2, the plurality of second fins 611 include the plurality of peripheral wall side fins 612 and the plurality of heat receiving plate side fins 613.

The plurality of peripheral wall side fins 612 are disposed between the phosphor wheel 51 and the peripheral wall 311 in the direction orthogonal to the rotation axis Rx.

The plurality of heat receiving plate side fins 613 are provided on the rotation axis Rx side with respect to the plurality of peripheral wall side fins 612, and are disposed between the heat receiving plate 57 and the heat dissipating fin 55 in the direction along the rotation axis Rx.

The plurality of peripheral wall side fins 612 allow the airflow that flowed toward the outside of the phosphor wheel 51 to flow toward the peripheral wall 311, and the plurality of heat receiving plate side fins 613 allow the airflow turned back at the peripheral wall 311 to flow toward the rotation axis Rx side.

According to such a configuration, the airflow that flowed toward the outside of the phosphor wheel 51 flows through the plurality of peripheral wall side fins 612 and the plurality of heat receiving plate side fins 613, and then flows toward the rotation axis Rx side. Therefore, it is possible to efficiently receive heat from the airflow, and to improve the cooling efficiency of the airflow flowing through the phosphor wheel 51, and thus the cooling efficiency of the wavelength conversion portion 53.

In the phosphor unit PS2, the plurality of peripheral wall side fins 612 are disposed along the circumferential direction around the rotation axis Rx, and the plurality of heat receiving plate side fins 613 are disposed along the circumferential direction around the rotation axis Rx. The inter-fin pitch of the plurality of peripheral wall side fins 612 is smaller than the inter-fin pitch of the plurality of heat receiving plate side fins 613.

According to such a configuration, the airflow circulating among the phosphor wheel 51, the peripheral wall 311, and the heat receiving plate 57 can smoothly flow through the plurality of peripheral wall side fins 612 and the plurality of heat receiving plate side fins 613 disposed as described above.

The plurality of peripheral wall side fins 612 can be densely disposed outside the plurality of heat receiving plate side fins 613. Therefore, a contact area between the peripheral wall side fins 612 and the airflow can be increased, and the cooling efficiency of the airflow and the cooling efficiency of the phosphor wheel 51 can be improved.

Therefore, since the cooling efficiency of the wavelength conversion portion 53 with respect to a volume of the phosphor unit PS2 is high, a cooling structure of the wavelength conversion portion 53 can be downsized. Therefore, it is possible to contribute to downsizing of the phosphor unit PS2, and further to downsizing of the light source device 3 in which the phosphor unit PS2 is adopted and the projector 1.

In the phosphor unit PS2, each of the plurality of peripheral wall side fins 612 is inclined in the rotation direction of the phosphor wheel 51 from the end portion on the rotation axis Rx side toward the peripheral wall 311. The intersection angle γ between the tangent line TG of the outer peripheral edge of the phosphor wheel 51 located on the virtual line VL1 coupling the inner peripheral side end portion of one of the plurality of peripheral wall side fins 612 and the rotation axis Rx, and an extending direction of the one peripheral wall side fin 612 is 350 or more and 850 or less.

According to such a configuration, the airflow that flowed toward the outside of the phosphor wheel 51 from the heat dissipating fin 55 can efficiently flow between the fins of the plurality of peripheral wall side fins 612. Therefore, efficiency of receiving heat from the airflow by the plurality of peripheral wall side fins 612 can be improved.

Modification of Second Embodiment

In the phosphor unit PS2, the heat receiving fin 61 includes the plurality of second fins 611 including the plurality of peripheral wall side fins 612 and the plurality of heat receiving plate side fins 613. The plurality of peripheral wall side fins 612 and the plurality of heat receiving plate side fins 613 are separated. However, the present disclosure is not limited thereto, and the plurality of second fins 611 constituting the heat receiving fin 61 may be fins in which the peripheral wall side fins 612 and the heat receiving plate side fins 613 are integrated.

Figure 18:
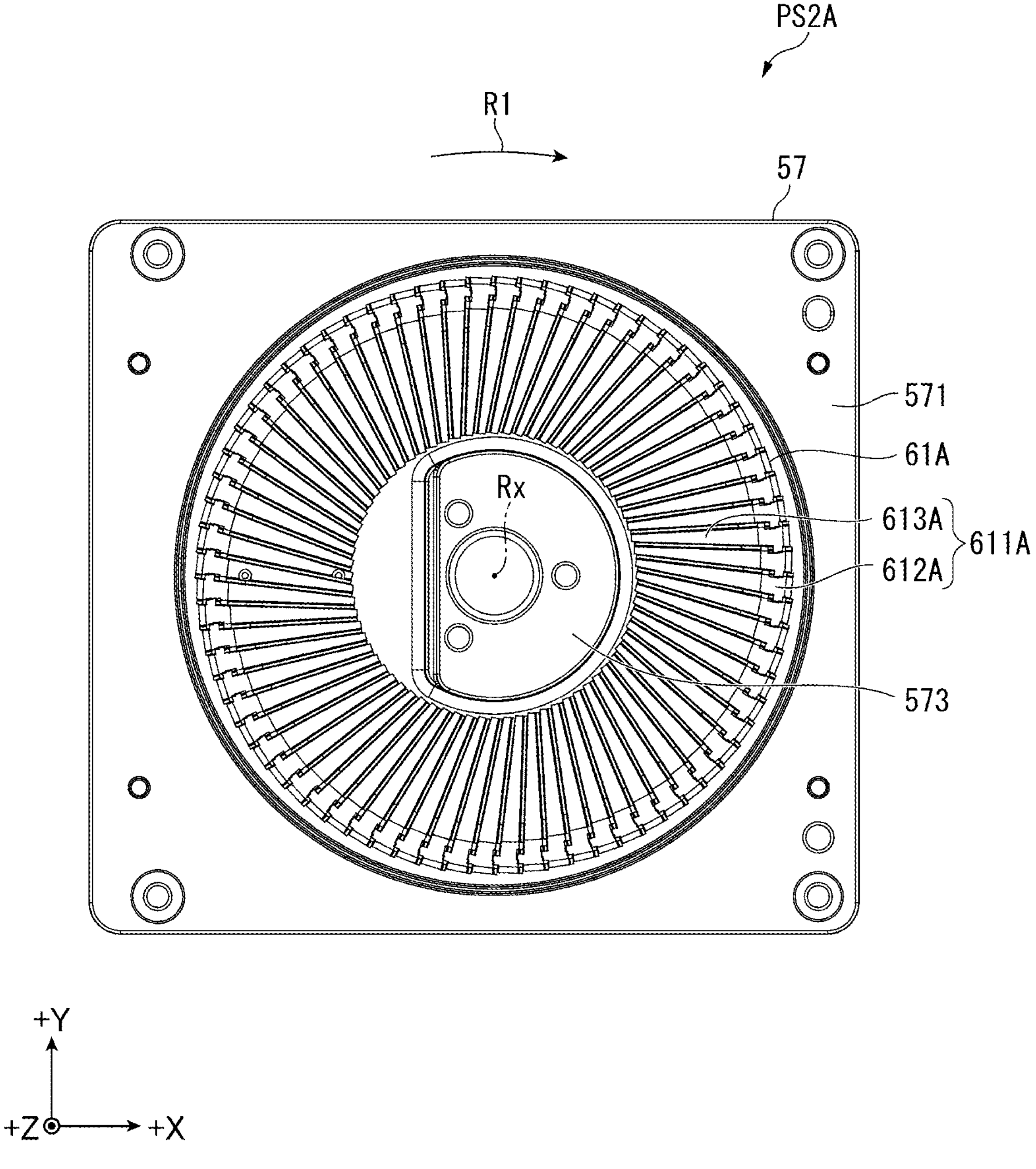
FIG. 18 is a plan view showing a heat receiving fin of a phosphor unit according to a modification of the second embodiment.

FIG. 18 is a plan view of a heat receiving fin 61A of a phosphor unit PS2A, which is a modification of the phosphor unit PS2, as viewed from the +Z direction.

Specifically, the phosphor unit PS2A, which is the modification of the phosphor unit PS2, has the same configuration and function as the phosphor unit PS2 except that the heat receiving fin 61A shown in FIG. 18 is provided instead of the heat receiving fin 61.

The heat receiving fin 61A includes a plurality of second fins 611A arranged in a circumferential direction around the rotation axis Rx, and each of the plurality of second fins 611A extends to be inclined in the R1 direction from an end portion on a rotation axis Rx side toward the peripheral wall 311.

The second fins 611A are fins in which the peripheral wall side fins 612 and the heat receiving plate side fins 613 are integrated. That is, each of the plurality of second fins 611A is a single fin having a peripheral wall side fin portion 612A and a heat receiving plate side fin portion 613A.

Therefore, an inter-fin pitch of the plurality of second fins 611A on an outer peripheral edge of the heat receiving fin 61A is the same as an inter-fin pitch of the plurality of second fins 611A on an inner peripheral edge.

A projector including such a phosphor unit PS2A can also attain the same effects as the projector including the phosphor unit PS2.

Third Embodiment

Next, a third embodiment of the present disclosure will be described.

A projector according to the embodiment has the same configuration as the projector according to the second embodiment, but is different in that a heat receiving fin has a peripheral wall portion surrounding the plurality of peripheral wall side fins 612. In the following description, portions that are the same as or substantially the same as portions already described are denoted by the same reference numerals, and description thereof will be omitted.

General Configuration of Projector

Figure 19:
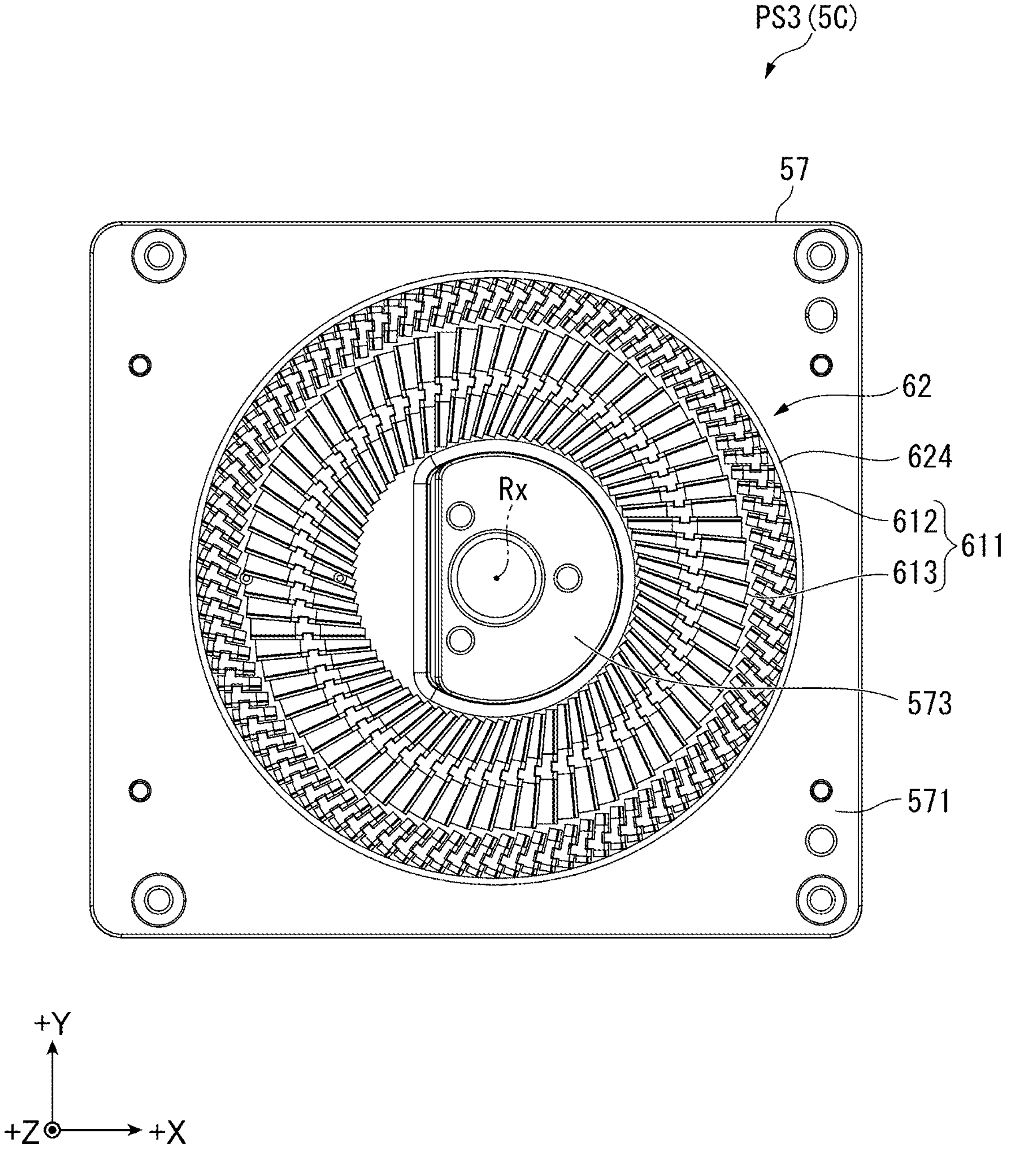
FIG. 19 is a plan view showing a heat receiving fin of a phosphor unit provided in a projector according to a third embodiment.

FIG. 19 is a plan view of a heat receiving fin 62 of a phosphor unit PS3 provided in the projector according to the embodiment as viewed from the +Z direction.

The projector according to the embodiment has the same configuration and function as the projector 1 according to the first embodiment except that the phosphor unit PS3 shown in FIG. 19 is provided instead of the phosphor unit PS1. That is, the light source device 3 according to the embodiment has the same configuration and function as the light source device 3 according to the first embodiment except that the phosphor unit PS3 is provided instead of the phosphor unit PS1.

Configuration of Phosphor Unit

The phosphor unit PS3 has the same configuration and function as the phosphor unit PS1 according to the first embodiment except that the heat receiving fin 62 shown in FIG. 19 is provided instead of the heat receiving fin 58 according to the first embodiment. Specifically, the phosphor unit PS3 includes a wavelength conversion device 5C. The wavelength conversion device 5C has the same configuration and function as the wavelength conversion device 5B according to the second embodiment except that the heat receiving fin 62 is provided instead of the heat receiving fin 61 according to the second embodiment.

That is, the phosphor unit PS3 includes the phosphor wheel 51, the rotation device 56, the heat receiving plate 57, the heat receiving fin 62, the thermoelectric conversion element 59, and the heat dissipating device 60.

Configuration of Heat Receiving Fin

The heat receiving fin 62 has the same configuration and function as the heat receiving fin 62 according to the second embodiment except that a peripheral wall portion 624 is further provided. Specifically, the heat receiving fin 62 includes the plurality of second fins 611 including the plurality of peripheral wall side fins 612 and the plurality of heat receiving plate side fins 613 according to the second embodiment, and the peripheral wall portion 624, and the plurality of second fins 611 transfer the received heat to the heat receiving plate 57.

Configuration of Peripheral Wall Portion

The peripheral wall portion 624 is located outside the plurality of second fins 611 with respect to the rotation axis Rx. The peripheral wall portion 624 is formed in a ring shape surrounding the plurality of peripheral wall side fins 612 around the rotation axis Rx, and is disposed on a rotation axis Rx side with respect to the peripheral wall 311 of the light source housing 31. Specifically, the peripheral wall portion 624 is formed in a ring shape coupling outer peripheral side end portions of the plurality of peripheral wall side fins 612 as viewed from the +Z direction. A dimension of the peripheral wall portion 624 in the +Z direction is substantially the same as a dimension of the peripheral wall side fin 612 in the +Z direction.

An end portion of the peripheral wall portion 624 in the −Z direction is coupled to the heat receiving plate 57, and may not be coupled to the heat receiving plate 57.

When an end portion of each of the peripheral wall side fins 612 in the +Z direction is located in the +Z direction of the second surface 522 of the phosphor wheel 51, the peripheral wall portion 624 may couple portions of the plurality of peripheral wall side fins 612 facing the +Z direction.

Figure 20:
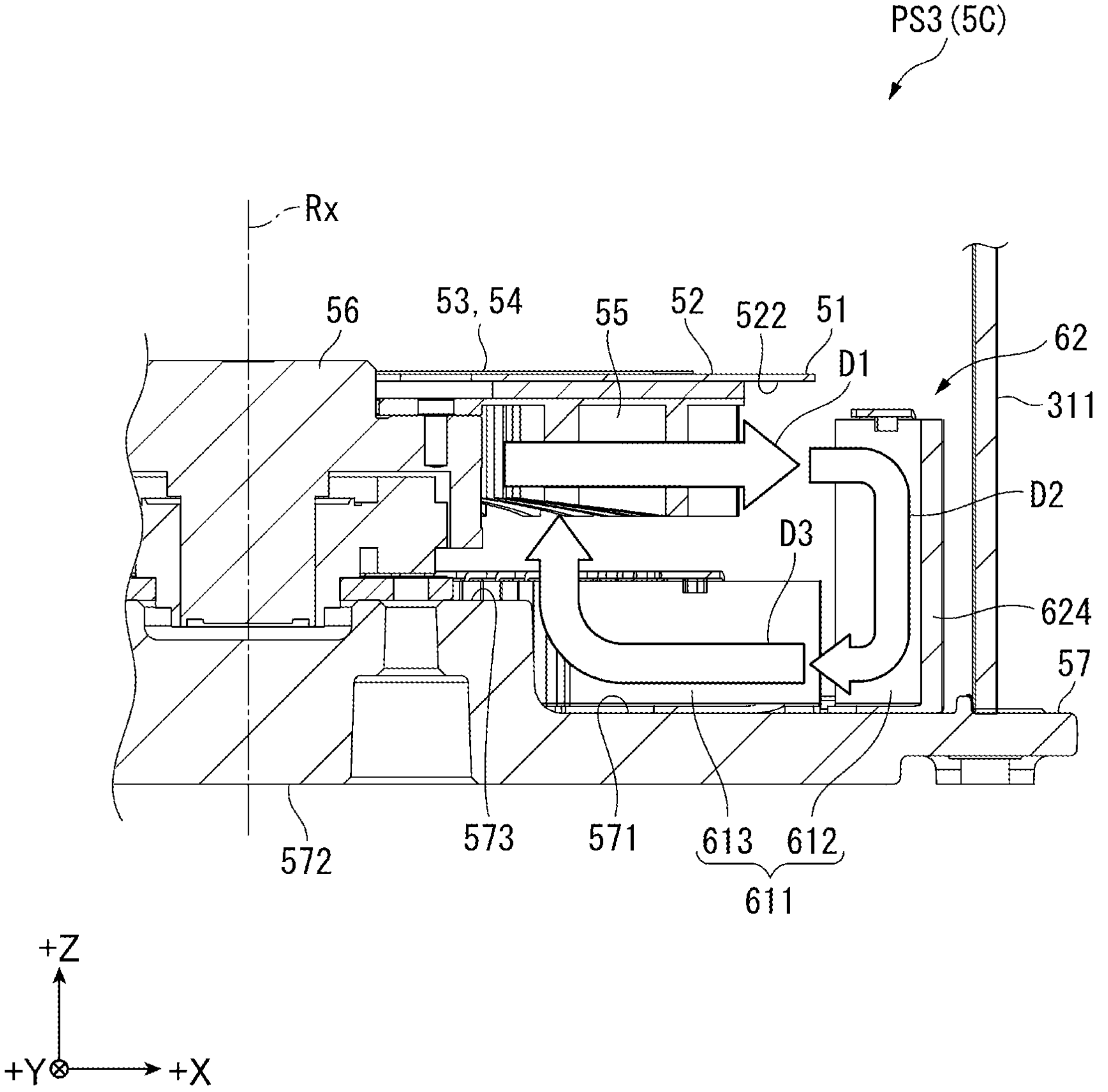
FIG. 20 is a cross-sectional view showing the heat receiving fin according to the third embodiment.

FIG. 20 is a cross-sectional view of the heat receiving fin 62 taken along the XZ plane. In FIG. 20, some of the peripheral wall side fins 612 and the heat receiving plate side fins 613 are not shown in order to facilitate understanding of a function of the peripheral wall portion 624.

As shown in FIG. 20, similarly to the peripheral wall 311 of the phosphor unit PS2 according to the second embodiment, the peripheral wall portion 624 turns back an airflow that is discharged from the rotating phosphor wheel 51 to the outside of the phosphor wheel 51 and flowed through the plurality of peripheral wall side fins 612.

Specifically, when the phosphor wheel 51 rotates, an airflow flowing from the rotation axis Rx side to the outside is generated by the heat dissipating fin 55 as indicated by an arrow D1. As indicated by an arrow D2, the airflow that flowed out to the outside of the phosphor wheel 51 flows between the fins of the plurality of peripheral wall side fins 612 in a region in the +Z direction, and is then turned back at the peripheral wall portion 624. The turned back airflow flows between the fins of the plurality of peripheral wall side fins 612 in a region in the −Z direction toward the rotation axis Rx side. The airflow that flowed between the fins of the plurality of peripheral wall side fins 612 flows between fins of the plurality of heat receiving plate side fins 613 toward the rotation axis Rx side as indicated by an arrow D3. The airflow that flowed to a center of the heat receiving fin 62 is again sucked by the rotating phosphor wheel 51, and flows out to the outside of the phosphor wheel 51 via the heat dissipating fin 55 as indicated by the arrow D1.

In this way, since the peripheral wall portion 624 turns back the airflow, the phosphor unit PS3 may not include the peripheral wall 311 of the light source housing 31.

Effects of Third Embodiment

The projector according to the embodiment described above has the following effects in addition to the same effects as the projector according to the second embodiment.

That is, the phosphor unit PS3 includes the phosphor wheel 51, the heat receiving plate 57, and the heat receiving fin 62.

The phosphor wheel 51 rotates around the rotation axis Rx. The phosphor wheel 51 includes the substrate 52, the wavelength conversion portion 53, and the heat dissipating fin 55.

The substrate 52 includes the first surface 521 and the second surface 522 provided on an opposite side from the first surface 521 and facing the heat receiving plate 57. The substrate 52 rotates around the rotation axis Rx.

The wavelength conversion portion 53 is disposed on the first surface 521, and includes the phosphor that converts the wavelength of the incident light.

The heat dissipating fin 55 is disposed on the second surface 522. The heat dissipating fin 55 includes a plurality of first fins that generate an airflow in a direction from a center of the second surface 522 toward the outside by the rotation of the substrate 52 and dissipates heat transferred from the wavelength conversion portion 53 to the generated airflow.

The heat receiving plate 57 intersects the rotation axis Rx on the rotation axis Rx and faces the phosphor wheel 51. The heat receiving plate 57 is spaced apart from the phosphor wheel 51.

The heat receiving fin 62 is fixed to the heat receiving plate 57. The heat receiving fin 62 includes the peripheral wall portion 624 and the plurality of second fins 611.

The peripheral wall portion 624 includes the plurality of second fins 611 and the peripheral wall portion 624.

The plurality of second fins 611 transfer the received heat to the heat receiving plate 57.

The peripheral wall portion 624 is located outside the plurality of second fins 611 with respect to the rotation axis Rx.

An airflow flowing from the phosphor wheel 51 circulates to the phosphor wheel 51 via the peripheral wall portion 624 of the heat receiving fin 62 and the plurality of second fins 611.

According to such a configuration, similarly to the phosphor unit PS2 according to the second embodiment, the wavelength conversion portion 53 can be effectively cooled.

Specifically, the airflow flowing from the phosphor wheel 51 through the heat dissipating fin 55 circulates to the phosphor wheel 51 via the peripheral wall portion 624 and the plurality of second fins 611. The circulating airflow flows through the plurality of second fins 611 of the heat receiving fin 62 fixed to the heat receiving plate 57, and the plurality of second fins 611 receive heat from the airflow. The heat received by the plurality of second fins 611 is transferred to the heat receiving plate 57, and the heat receiving plate 57 also receives heat from the airflow. Accordingly, the airflow flowing through the heat dissipating fin 55 is cooled. In this way, a temperature of the airflow flowing through the heat dissipating fin 55 can be maintained low by the heat receiving fin 62 fixed to the heat receiving plate 57, and thus cooling efficiency of the wavelength conversion portion 53 can be improved.

The airflow flowing through the heat dissipating fin 55 circulates in a space surrounded by the phosphor wheel 51, the peripheral wall portion 624, and the plurality of second fins 611 to cool the heat dissipating fin 55. Therefore, since the cooling efficiency of the wavelength conversion portion 53 with respect to a volume of the phosphor unit PS3 is high, a cooling structure of the wavelength conversion portion 53 can be downsized. Therefore, it is possible to contribute to downsizing of the phosphor unit PS3, and further to downsizing of the light source device 3 in which the phosphor unit PS3 is adopted and the projector 1.

Similarly to the phosphor unit PS2A according to the modification of the second embodiment, each of the plurality of second fins 611 constituting the heat receiving fin 62 may be a fin that includes a peripheral wall side fin portion and a heat receiving plate side fin portion and in which the peripheral wall side fin 612 and the heat receiving plate side fin 613 are integrated.

Fourth Embodiment

Next, a fourth embodiment of the present disclosure will be described.

A projector according to the embodiment has the same configuration as the projector according to the third embodiment, but is different in that a heat pipe as a heat transport element is further provided. In the following description, portions that are the same as or substantially the same as portions already described are denoted by the same reference numerals, and description thereof will be omitted.

General Configuration of Projector

Figure 21:
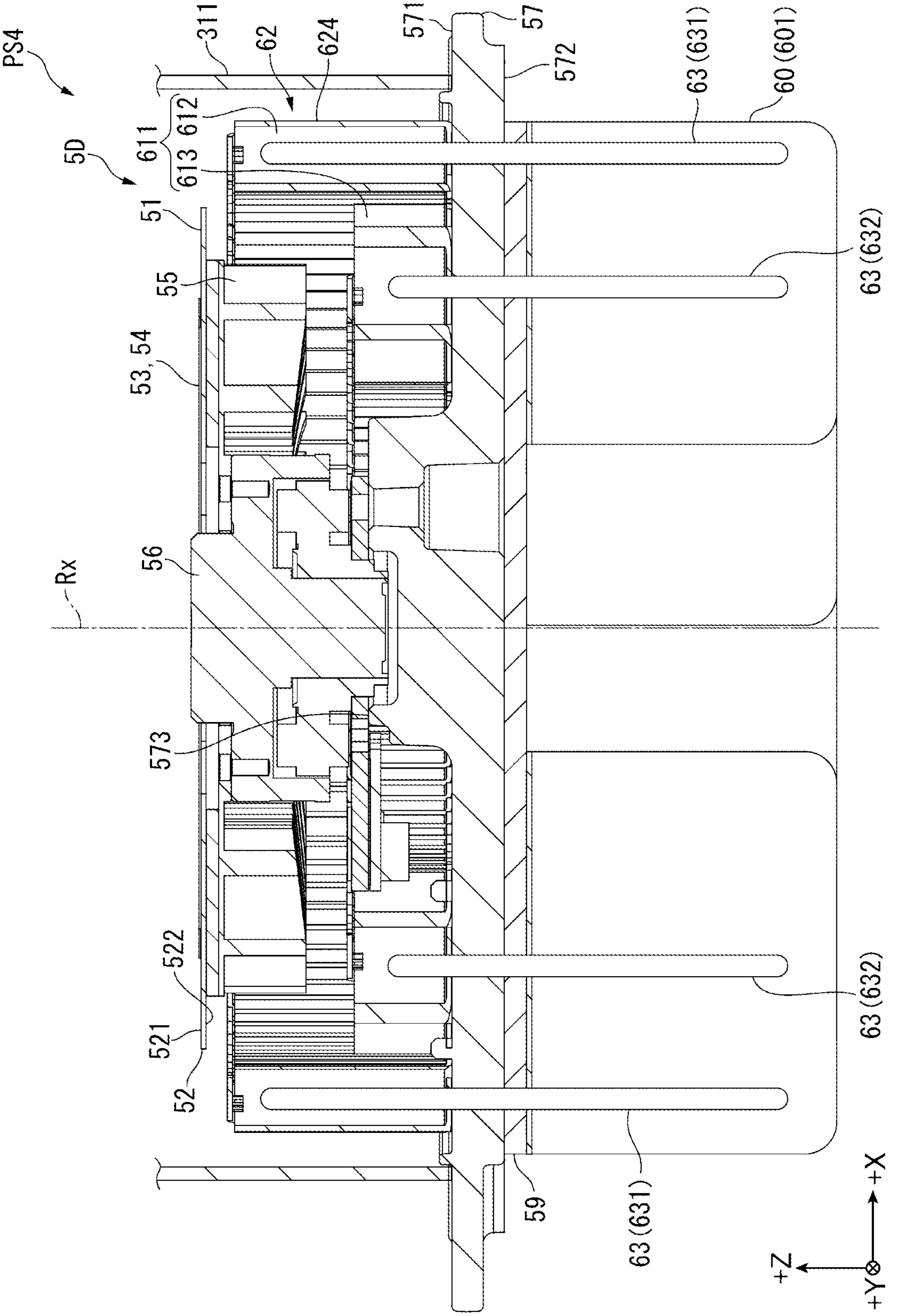
FIG. 21 is a cross-sectional view showing a phosphor unit provided in a projector according to a fourth embodiment.

FIG. 21 is a cross-sectional view along the XZ plane of a phosphor unit PS4 provided in the projector according to the embodiment. In FIG. 21, the duct 602 and the cooling fan 603 constituting the heat dissipating device 60 are not shown.

The projector according to the embodiment has the same configuration and function as the projector 1 according to the first embodiment except that the phosphor unit PS4 shown in FIG. 21 is provided instead of the phosphor unit PS1. That is, the light source device 3 according to the embodiment has the same configuration and function as the light source device 3 according to the first embodiment except that the phosphor unit PS4 is provided instead of the phosphor unit PS1.

Configuration of Phosphor Unit

As shown in FIG. 21, the phosphor unit PS4 has the same configuration and function as the phosphor unit PS3 according to the third embodiment except that a plurality of heat pipes 63 are further provided. Specifically, the phosphor unit PS4 includes the peripheral wall 311 and a wavelength conversion device 5D. The wavelength conversion device 5D includes the plurality of heat pipes 63 in addition to the phosphor wheel 51, the rotation device 56, the heat receiving plate 57, the heat receiving fin 62, the thermoelectric conversion element 59, and the heat dissipating device 60.

The plurality of heat pipes 63 couple the heat receiving fin 62 to the heat dissipating device 60, and transport a part of the heat received from the airflow by the heat receiving fin 62 to the heat dissipating device 60.

Specifically, each of the plurality of heat pipes 63 penetrates the heat receiving plate 57 and the thermoelectric conversion element 59 along the rotation axis Rx. One end of each heat pipe 63 is coupled to the heat receiving fin 62, and the other end of the heat pipe 63 is coupled to the heat sink 601 of the heat dissipating device 60.

Each heat pipe 63 is disposed to be exposed between fins of the plurality of second fins 611 constituting the heat receiving fin 62, and receives heat from the airflow flowing between the fins of the plurality of second fins 611.

The plurality of heat pipes 63 include a plurality of first heat pipes 631 and a plurality of second heat pipes 632.

Each of the plurality of first heat pipes 631 is coupled to at least one of the plurality of peripheral wall side fins 612 constituting the heat receiving fin 62. The first heat pipe 631 transports a part of the heat received by at least one peripheral wall side fin 612 to the heat sink 601. In addition, the first heat pipe 631 transports the heat received from the airflow flowing between the fins of the plurality of peripheral wall side fins 612 to the heat sink 601. Each of the plurality of second heat pipes 632 is coupled to at least one of the plurality of heat receiving plate side fins 613 constituting the heat receiving fin 62. The second heat pipe 632 transports a part of the heat received by at least one heat receiving plate side fin 613 to the heat sink 601. In addition, the second heat pipe 632 transports the heat received from the airflow flowing between the fins of the plurality of heat receiving plate side fins 613 to the heat sink 601.

Effects of Fourth Embodiment

The projector according to the embodiment has the following effects in addition to the same effects as the projector according to the third embodiment.

The phosphor unit PS4 includes the heat pipe 63 coupling the heat receiving fin 62 to the heat dissipating device 60.

According to such a configuration, the heat received from the airflow by the heat receiving fin 62 can be transferred not only to the heat dissipating device 60 via the heat receiving plate 57 but also from the heat receiving fin 62 to the heat dissipating device 60 via the heat pipe 63. Therefore, the heat received by the heat receiving fin 62 can be efficiently transferred to the heat dissipating device 60.

The phosphor unit PS4 may not include the thermoelectric conversion element 59.

The phosphor unit PS4 may include the heat receiving fin 58 according to the first embodiment or the heat receiving fin 61 according to the second embodiment instead of the heat receiving fin 62.

Fifth Embodiment

Next, a fifth embodiment of the present disclosure will be described.

A projector according to the embodiment has the same configuration as the projector according to the first embodiment, but is different in that the configuration and arrangement of a heat receiving fin in a phosphor unit are different and a heat pipe is provided. In the following description, portions that are the same as or substantially the same as portions already described are denoted by the same reference numerals, and description thereof will be omitted.

General Configuration of Projector

Figure 22:
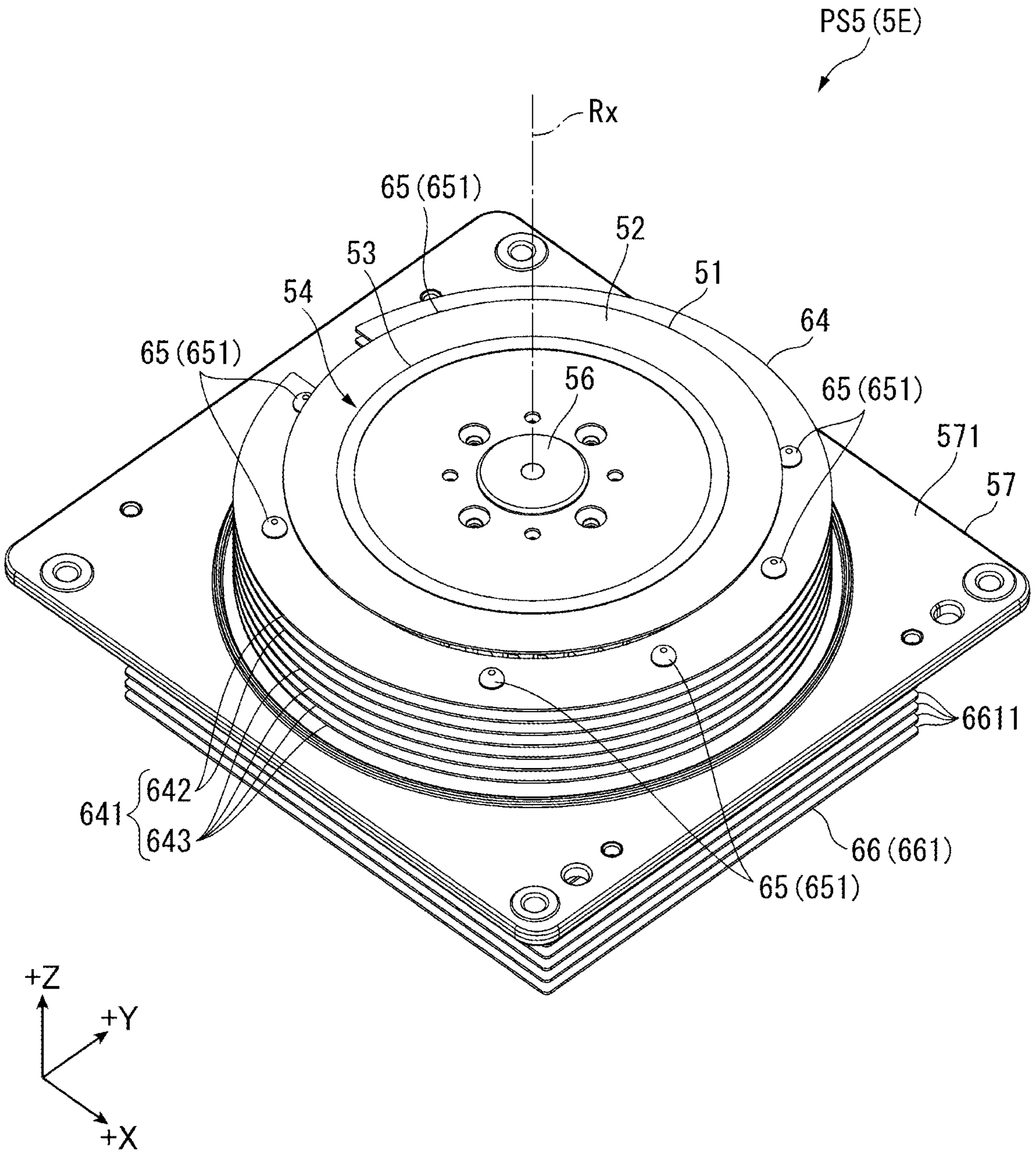
FIG. 22 is a perspective view showing a phosphor unit provided in a projector according to a fifth embodiment.
Figure 23:
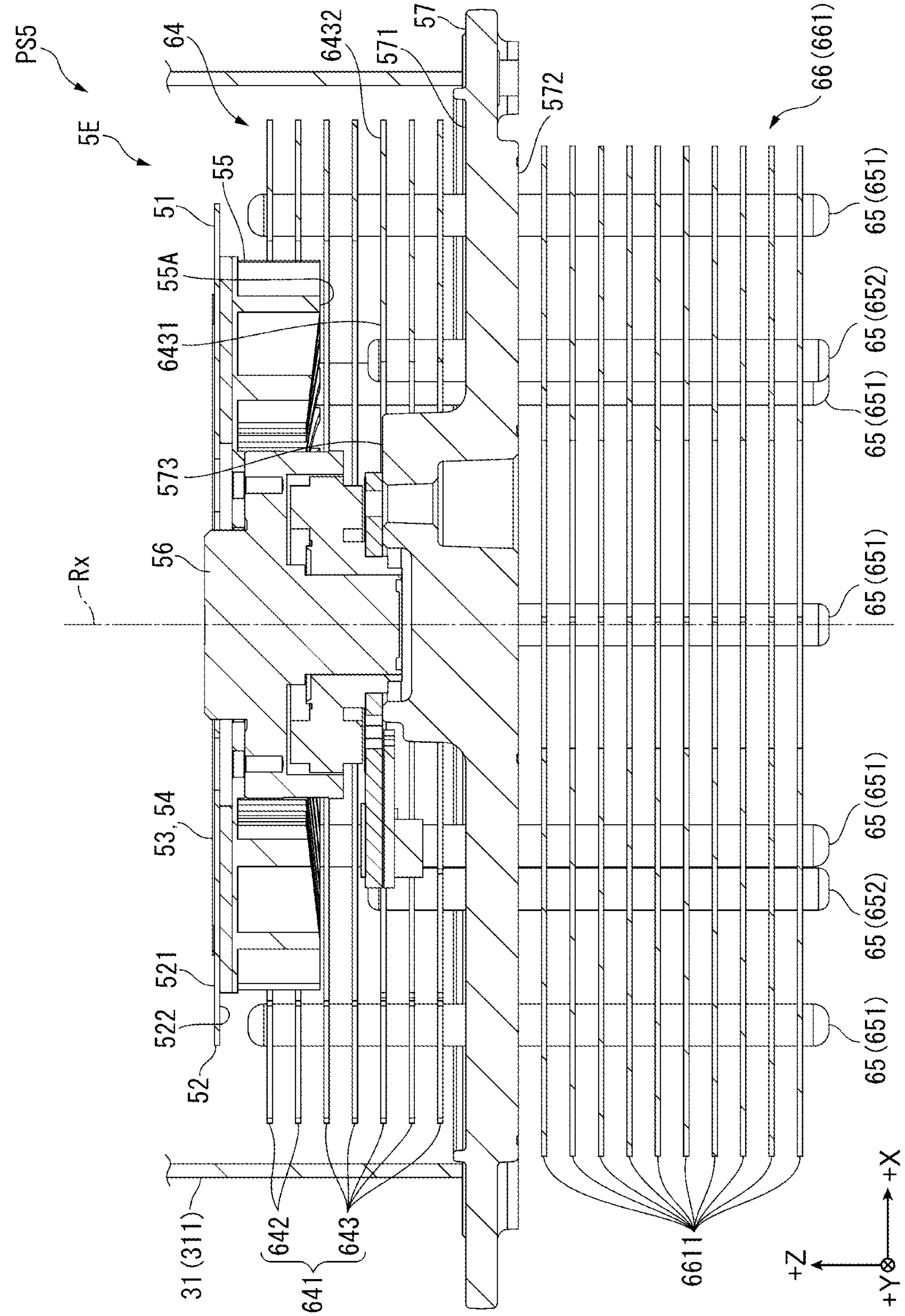
FIG. 23 is a cross-sectional view showing the phosphor unit according to the fifth embodiment.

FIG. 22 is a perspective view showing a phosphor unit PS5 provided in the projector according to the embodiment, and FIG. 23 is a cross-sectional view showing the phosphor unit PS5 along the XZ plane. In FIGS. 22 and 23, the duct 602 and the cooling fan 603 are not shown, and in FIG. 21, the peripheral wall 311 is further not shown.

The projector according to the embodiment has the same configuration and function as the projector 1 according to the first embodiment except that the phosphor unit PS5 shown in FIGS. 22 and 23 is provided instead of the phosphor unit PS1. That is, the light source device 3 according to the embodiment has the same configuration and function as the light source device 3 according to the first embodiment except that the phosphor unit PS5 is provided instead of the phosphor unit PS1.

Configuration of Phosphor Unit

The phosphor unit PS5 includes the peripheral wall 311 and a wavelength conversion device 5E, and has the same function as the phosphor units PS1 to PS4 according to the first to fourth embodiments.

The wavelength conversion device 5E has the same configuration and function as the wavelength conversion device 5A except that a heat receiving fin 64, a heat pipe 65, and a heat dissipating device 66 are provided instead of the heat receiving fin 58, the thermoelectric conversion element 59, and the heat dissipating device 60. That is, the wavelength conversion device 5E includes the phosphor wheel 51, the rotation device 56, the heat receiving plate 57, the heat receiving fin 64, the heat pipe 65, and the heat dissipating device 66.

Configuration of Heat Receiving Fin

Similarly to the heat receiving fins 58, 61, and 62, the heat receiving fin 64 receives heat from an airflow flowing from the phosphor wheel 51 to the outside. As will be described in detail later, the heat receiving fin 64 is fixed to the heat receiving plate 57 by the heat pipe 65.

The heat receiving fin 64 includes a plurality of second fins 641 extending in a direction orthogonal to the rotation axis Rx and disposed along the rotation axis Rx so as to overlap the heat receiving plate 57.

The plurality of second fins 641 include a plurality of peripheral wall side fins 642 and a plurality of heat receiving plate side fins 643. The peripheral wall side fins 642 and the heat receiving plate side fins 643 are formed in a ring shape as viewed from the +Z direction as shown in FIG. 22, and are formed in a flat plate shape as shown in FIG. 23.

As shown in FIGS. 22 and 23, the plurality of peripheral wall side fins 642 are disposed between the phosphor wheel 51 and the peripheral wall 311 in a direction orthogonal to the rotation axis Rx, and are disposed side by side in a direction along the rotation axis Rx. That is, the plurality of peripheral wall side fins 642 surround the phosphor wheel 51 inside the peripheral wall 311. As shown in FIG. 23, the plurality of peripheral wall side fins 642 are provided in the +Z direction along the rotation axis Rx between the second surface 522 of the phosphor wheel 51 and a surface 55A of the heat dissipating fin 55 facing the heat receiving plate 57.

The airflow that flowed from the heat dissipating fin 55 toward the outside of the phosphor wheel 51 with the rotation of the phosphor wheel 51 flows between fins of the plurality of peripheral wall side fins 642, is received in terms of heat by the peripheral wall side fins 642, and then flows toward the peripheral wall 311.

In the embodiment, two peripheral wall side fins 642 are provided.

As shown in FIG. 23, the plurality of heat receiving plate side fins 643 are disposed between the surface 55A of the heat dissipating fin 55 and the heat receiving surface 571 of the heat receiving plate 57 in the +Z direction along the rotation axis Rx. The plurality of heat receiving plate side fins 643 allow the airflow turned back at the peripheral wall 311 to flow toward the rotation axis Rx side. The plurality of heat receiving plate side fins 643 receive heat from the airflow in a process during which the airflow flowing toward the rotation axis Rx side flows between the fins of the plurality of heat receiving plate side fins 643.

Each of the heat receiving plate side fins 643 has an inner region 6431 overlapping with the heat dissipating fin 55 as viewed from the −Z direction, and an outer region 6432 disposed outside the heat dissipating fin 55. Since the outer region 6432 is provided in the heat receiving plate side fin 643, a surface area of the heat receiving plate side fin 643 can be enlarged, and a contact area with the airflow can be enlarged.

In the embodiment, five heat receiving plate side fins 643 are provided.

Configuration of Heat Dissipating Device

For convenience of description, the heat dissipating device 66 will be described before the heat pipe 65.

The heat dissipating device 66 dissipates the heat transferred from the heat pipe 65 to the outside of the light source housing 31. As shown in FIGS. 22 and 23, the heat dissipating device 66 includes a heat sink 661, and further includes the duct 602 and the cooling fan 603 according to the first embodiment although not shown in FIGS. 22 and 23.

The heat sink 661 has a configuration in which a plurality of plate-shaped fins 6611 orthogonal to the rotation axis Rx are disposed along the rotation axis Rx. That is, a cooling gas sent out from the cooling fan 603 and flowing through the duct 602 can flow along the +X direction between fins of the plurality of fins 6611. The plurality of fins 6611 transfer the heat transferred from the heat pipe 65 to the cooling gas flowing between the fins along the +X direction.

Configuration of Heat Pipe

Similarly to the heat pipe 63 according to the fourth embodiment, the heat pipe 65 couples the heat receiving fin 64 to the heat dissipating device 66. Specifically, the heat pipe 65 couples the second fins 641 of the heat receiving fin 64 to the heat sink 661 of the heat dissipating device 66 so as to be able to transfer heat. The heat pipe 65 transports the heat received by the plurality of second fins 641 to the heat sink 661.

In the present embodiment, a plurality of heat pipes 65 are provided. Each of the plurality of heat pipes 65 extends along the rotation axis Rx and penetrates the heat receiving plate 57. As shown in FIG. 23, the plurality of heat pipes 65 include a plurality of first heat pipes 651 and a plurality of second heat pipes 652.

An end portion of each first heat pipe 651 in the +Z direction is coupled to the peripheral wall side fins 642 and the outer regions 6432 of the heat receiving plate side fins 643, and penetrates the heat receiving plate 57 along the rotation axis Rx. In other words, the first heat pipe 651 functions as a support column that fixes the peripheral wall side fins 642 and the heat receiving plate side fins 643 to the heat receiving plate 57. An end portion of each first heat pipe 651 in the −Z direction is coupled to the fins 6611 of the heat sink 661. An end portion of each second heat pipe 652 in the +Z direction is coupled to the inner regions 6431 of the heat receiving plate side fins 643 and penetrates the heat receiving plate 57 along the rotation axis Rx. In other words, the second heat pipe 652 functions as a support column that fixes the heat receiving plate side fins 643 to the heat receiving plate 57. An end portion of each second heat pipe 652 in the −Z direction is coupled to the fins 6611 of the heat sink 661.

Heat Transfer in Phosphor Unit

An airflow flowing between fins of the heat dissipating fin 55 and sent out to the outside of the phosphor wheel 51 flows between the fins of the plurality of peripheral wall side fins 642, is received in terms of heat by the peripheral wall side fins 642, and then reaches the peripheral wall 311. The airflow turned back at the peripheral wall 311 flows between the fins of the plurality of heat receiving plate side fins 643 toward the rotation axis Rx, and is received in terms of heat by the plurality of heat receiving plate side fins 643. The airflow that flowed along the heat receiving plate side fins 643 is sucked by the phosphor wheel 51, flows between the fins of the heat dissipating fin 55 again, and is sent out to the outside of the phosphor wheel 51.

The heat received by the plurality of peripheral wall side fins 642, the plurality of heat receiving plate side fins 643, and the heat receiving surface 571 of the heat receiving plate 57 is transported to the plurality of fins 6611 in the duct 602 via the plurality of heat pipes 65.

The heat transported to the plurality of fins 6611 is transferred to the cooling gas flowing between the fins of the plurality of fins 6611 by the cooling fan 603. The cooling gas that flowed between the fins of the plurality of fins 6611 is discharged to the outside of the duct 602.

In this way, the heat of the wavelength conversion portion 53 disposed in the light source housing 31 that is a sealed housing is dissipated to the outside of the light source housing 31.

Effects of Fifth Embodiment

The projector according to the embodiment described above has the following effects in addition to the same effects as the projector according to the first embodiment.

In the phosphor unit PS5, each of the plurality of second fins 641 provided in the heat receiving fin 64 extends in a direction intersecting the rotation axis Rx of the phosphor wheel 51 and is disposed along the rotation axis Rx so as to overlap the heat receiving plate 57.

According to such a configuration, the airflow flows through the plurality of second fins 641 disposed so as to overlap the heat receiving plate 57. Accordingly, the heat can be transferred from the airflow that received the heat of the wavelength conversion portion 53 to the plurality of second fins 641, and a temperature of the airflow flowing through the wavelength conversion portion 53 can be lowered.

In the phosphor unit PS5, the plurality of second fins 641 include the plurality of heat receiving plate side fins 643 provided between the heat receiving plate 57 and the heat dissipating fin 55 in a direction along the rotation axis Rx and disposed along the rotation axis Rx. The plurality of heat receiving plate side fins 643 allow the airflow turned back at the peripheral wall 311 to flow toward the rotation axis Rx side.

According to such a configuration, the plurality of heat receiving plate side fins 643 receive heat from the airflow while allowing the airflow flowing from the heat dissipating fin 55 to the peripheral wall 311 and turned back at the peripheral wall 311 to flow toward the rotation axis Rx side. Accordingly, it is possible to receive heat from the airflow while smoothly circulating the airflow.

In the phosphor unit PS5, the plurality of second fins 641 include the plurality of peripheral wall side fins 642 provided between the phosphor wheel 51 and the peripheral wall 311 in a direction orthogonal to the rotation axis Rx and disposed along the rotation axis Rx. The plurality of peripheral wall side fins 642 allow the airflow that flowed to the outside of the phosphor wheel 51 to flow toward the peripheral wall 311.

According to such a configuration, the airflow that flowed through the heat dissipating fin 55 flows through the peripheral wall side fins 642 and then flows toward the peripheral wall 311. The airflow that flowed toward the peripheral wall 311 is turned back at the peripheral wall 311, and then flows through the heat receiving fin 64 toward the rotation axis Rx side. Accordingly, it is possible to receive heat from the airflow while smoothly circulating the airflow.

In the phosphor unit PS5, the plurality of second fins 641 include the plurality of peripheral wall side fins 642 and the plurality of heat receiving plate side fins 643.

The plurality of peripheral wall side fins 642 are provided between the phosphor wheel 51 and the peripheral wall 311 in the direction orthogonal to the rotation axis Rx, and are disposed along the rotation axis Rx.

The plurality of heat receiving plate side fins 643 are provided between the heat receiving plate 57 and the heat dissipating fin 55 in the direction along the rotation axis Rx, and are disposed along the rotation axis Rx.

The plurality of peripheral wall side fins 642 allow an airflow that flowed to the outside of the phosphor wheel 51 to flow toward the peripheral wall 311, and the plurality of heat receiving plate side fins 643 allow the airflow turned back at the peripheral wall 311 to flow toward the rotation axis Rx side.

According to such a configuration, the airflow that flowed toward the outside of the phosphor wheel 51 flows through the plurality of peripheral wall side fins 642 and the plurality of heat receiving plate side fins 643, and then flows toward the rotation axis Rx side. Therefore, it is possible to efficiently receive heat from the airflow and to smoothly circulate the airflow. Therefore, it is possible to improve cooling efficiency of the airflow flowing through the phosphor wheel 51, and thus cooling efficiency of the wavelength conversion portion 53.

The phosphor unit PS5 includes the heat pipe 65 that couples the heat receiving fin 64 to the heat dissipating device 66.

According to such a configuration, the heat received from the airflow by the heat receiving fin 64 can be transferred not only to the heat receiving plate 57 but also to the heat dissipating device 66. Therefore, the heat received by the heat receiving fin 64 can be efficiently transferred to the heat dissipating device 66.

The first heat pipe 651 functions as a support column that fixes the plurality of second fins 641 including the peripheral wall side fins 642 and the heat receiving plate side fins 643 to the heat receiving plate 57. Therefore, it is not necessary to separately provide the support column. Therefore, it is possible to limit an increase in the number of members of the phosphor unit PS5 while constituting the phosphor unit PS5 so as to efficiently perform heat transport from the heat receiving fin 64 to the heat dissipating device 66.

Modification of Embodiment

The present disclosure is not limited to the above embodiments, and modifications, improvements, and the like within a range in which the object of the present disclosure can be achieved are included in the present disclosure.

In the above embodiments, the heat dissipating devices 60 and 66 include the heat sinks 601 and 661, the duct 602, and the cooling fan 603. That is, each of the heat dissipating devices 60 and 66 dissipates heat of the wavelength conversion portion 53 to a cooling gas flowing to the outside of the light source housing 31. However, the present disclosure is not limited thereto, and the heat dissipating device may have other configurations.

Figure 24:
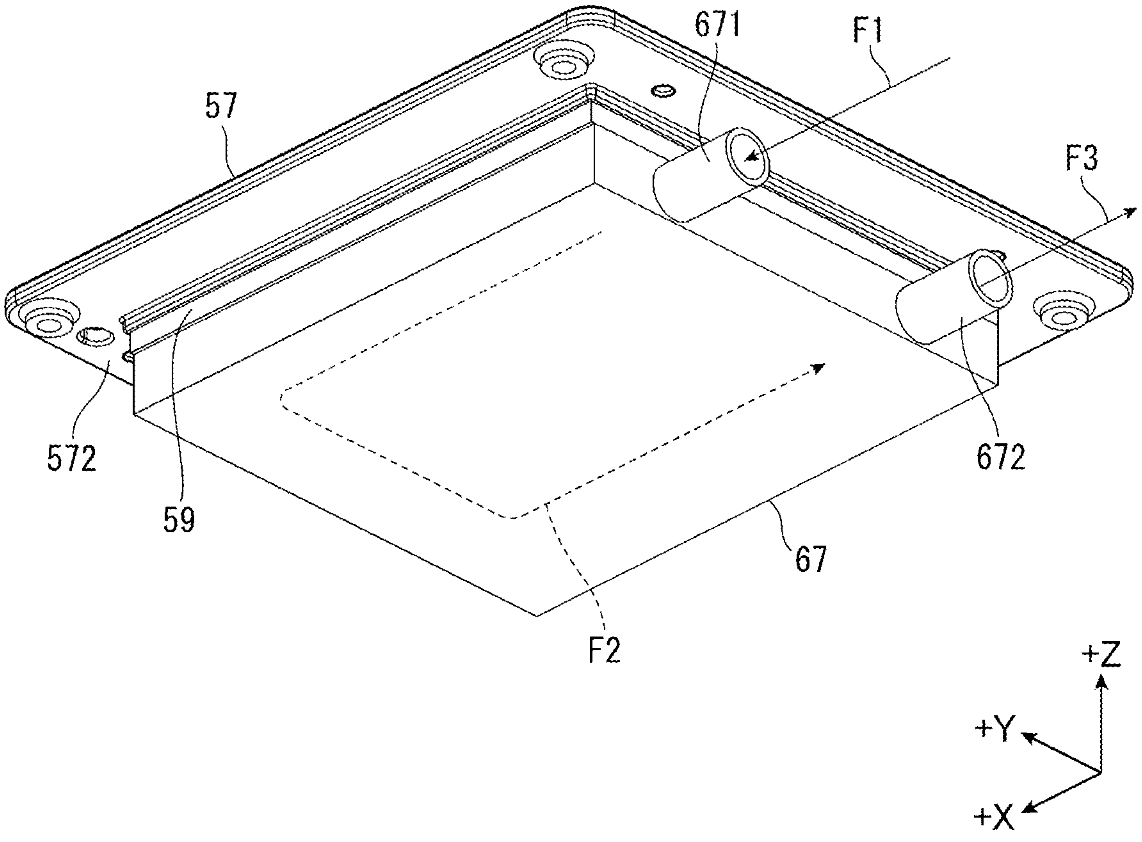
FIG. 24 is a perspective view showing a heat dissipating device according to a modification of each embodiment.

FIG. 24 is a perspective view showing a heat dissipating device 67 coupled to the heat dissipating surface 572 of the heat receiving plate 57 via the thermoelectric conversion element 59.

For example, instead of the heat dissipating devices 60 and 66, the heat dissipating device 67 shown in FIG. 24 may be adopted for the phosphor units PS1, PS2, PS2A, and PS3.

The heat dissipating device 67 includes an inflow portion 671 and an outflow portion 672, and allows a cooling liquid to flow therein. That is, a flow path (not shown) through which the cooling liquid flows is provided inside the heat dissipating device 67.

In the heat dissipating device 67, the cooling liquid that flowed to the inflow portion 671 along an arrow F1 flows through a flow path in the heat dissipating device 67 along an arrow F2, and is discharged from the outflow portion 672 along an arrow F3. The heat dissipating device 67 transfers heat transferred from the heat receiving plate 57 to the cooling liquid flowing therein via the thermoelectric conversion element 59.

When such a heat dissipating device 67 is adopted in the phosphor units PS1, PS2, PS2A, and PS3, the following effects can be attained.

The heat dissipating device 67 transfers the transferred heat to the cooling liquid flowing therein.

According to such a configuration, the heat transferred from the heat receiving plate 57 is transferred to the cooling liquid flowing therein, and thus efficiency of dissipating heat in the heat dissipating device 67 can be improved. Therefore, cooling efficiency of the wavelength conversion portion 53 can be improved.

If a part of the heat pipe 65 is disposed in the heat dissipating device 67 or the like and heat transported by the heat pipe 65 can be transferred to the cooling liquid, the heat dissipating device 67 can be adopted in the phosphor unit PS4 according to the fourth embodiment.

In the above embodiments, the peripheral wall 311 constitutes a part of the light source housing 31. However, the present disclosure is not limited thereto, and the peripheral wall constituting the phosphor unit may be a member independent of the light source housing 31 as in the peripheral wall portion 624 according to the third embodiment. In this case, the peripheral wall may be a member coupled to the light source housing 31.

In the second to fourth embodiments, the heat receiving fins 61 and 62 include the plurality of second fins 611 including the plurality of peripheral wall side fins 612 and the plurality of heat receiving plate side fins 613. In the fifth embodiment, the heat receiving fin 64 includes the plurality of second fins 641 including the plurality of peripheral wall side fins 642 and the plurality of heat receiving plate side fins 643. However, the present disclosure is not limited thereto, and the plurality of second fins constituting the heat receiving fin may include one of the peripheral wall side fins and the heat receiving plate side fins and may not include the other of the fins.

The number of the plurality of peripheral wall side fins and the number of the plurality of heat receiving plate side fins are not limited to the above, and may be appropriately changed.

In the second to fourth embodiments described above, the peripheral wall side fins 612 are inclined in a rotation direction of the phosphor wheel 51 from end portions on the rotation axis Rx side toward the peripheral wall 311. The intersection angle γ between the tangent line TG of the outer peripheral edge of the phosphor wheel 51 located on the virtual line VL1 coupling an end portion of the peripheral wall side fin 612 on the rotation axis Rx side and the rotation axis Rx, and the extending direction of the peripheral wall side fin 612 from the end portion on the rotation axis Rx side is 350 or more and 850 or less. However, the present disclosure is not limited thereto, and the extending direction of the peripheral wall side fin is not limited thereto.

In the above embodiments, the phosphor units PS1, PS2, PS2A, PS3, PS4, and PS5 include the heat dissipating devices 60 and 66. As described above, the heat dissipating device 67 can be adopted for the phosphor units PS1, PS2, PS2A, PS3, PS4, and PS5. However, the present disclosure is not limited thereto, and for example, the heat dissipating device may be omitted as long as the heat can be efficiently dissipated to the outside of the light source housing 31 by the heat receiving plate 57.

In the above embodiments, the phosphor units PS1, PS2, PS2A, PS3, PS4, and PS5 include the thermoelectric conversion element 59 provided between the heat receiving plate 57 and the heat dissipating devices 60 and 66. However, the present disclosure is not limited thereto, and the thermoelectric conversion element 59 may be omitted. The same applies to a case where the heat dissipating device 67 is adopted.

In the above embodiments, the projector includes the three light modulation elements 243R, 243G, and 243B. However, the present disclosure is not limited thereto, and the above-described configuration is also applicable to a projector including two or less or four or more light modulation elements.

In the above embodiments, the optical components constituting the image projection device 2 are disposed in the substantially L-shaped optical component housing 25 as shown in FIG. 1. The present disclosure is not limited thereto, and the optical components constituting the image projection device 2 may be disposed in, for example, a substantially U-shaped optical component housing.

In the above embodiments, a transmissive liquid crystal panel in which a light incident surface and a light emitting surface are different is exemplified as the light modulation element 243. However, the light modulation element may include a reflective liquid crystal panel in which a light incident surface and a light emitting surface are the same. As long as the light modulation element can modulate an incident light flux to form an image corresponding to image information, a light modulation element other than a liquid crystal may be used such as a device using a micro mirror, for example, a device using a digital micromirror device (DMD) or the like.

In the above embodiments, the light source device 3 is applied to a projector. However, the present disclosure is not limited thereto, and the light source device according to the present disclosure may be used for a lighting fixture, a headlight of an automatic vehicle, or the like.

SUMMARY OF PRESENT DISCLOSURE

A summary of the present disclosure will be appended below.

Appendix 1

A phosphor unit including:
- a phosphor wheel configured to rotate around a rotation axis;
- a peripheral wall surrounding the phosphor wheel along a circumferential direction around the rotation axis;
- a heat receiving plate intersecting the rotation axis on the rotation axis, facing the phosphor wheel, and spaced apart from the phosphor wheel; and
- a heat receiving fin fixed to the heat receiving plate and surrounded by the peripheral wall, wherein
- the phosphor wheel includes
  - a substrate having a first surface and a second surface that is provided on an opposite side from the first surface and faces the heat receiving plate, and configured to rotate around the rotation axis,
  - a wavelength conversion portion disposed on the first surface and containing a phosphor that converts a wavelength of incident light, and
  - a heat dissipating fin disposed on the second surface, and including a plurality of first fins that generate an airflow in a direction from a center of the second surface toward outside by rotation of the substrate and dissipate heat transferred from the wavelength conversion portion to the generated airflow, and
- the heat receiving fin includes a plurality of second fins through which an airflow circulating from the phosphor wheel to the phosphor wheel via the peripheral wall and the heat receiving plate flows, and that receives heat from the flowing airflow and transfers the heat to the heat receiving plate.

According to such a configuration, the phosphor contained in the wavelength conversion portion generates heat when converting the wavelength of the incident light. A part of the heat generated by the phosphor is transferred to the substrate, and a part of the heat transferred to the substrate is transferred to the heat dissipating fin via the substrate.

When the substrate rotates, a gas around the first surface of the substrate flows through the wavelength conversion portion to cool the wavelength conversion portion.

When the substrate rotates, an airflow flowing from the center of the second surface toward the outside is generated by the heat dissipating fin provided on the second surface. When the generated airflow flows through the plurality of first fins, the heat transferred from the wavelength conversion portion to the plurality of first fins via the substrate is transferred to the airflow. Accordingly, the wavelength conversion portion is further cooled.

The airflow that flowed through the heat dissipating fin is turned back at the peripheral wall surrounding the phosphor wheel, and flows toward the center of the second surface that becomes a negative pressure due to the rotation of the substrate. That is, the airflow that flowed toward the outside of the phosphor wheel circulates to the center of the second surface via the peripheral wall and the heat receiving plate. The circulating airflow flows through the plurality of second fins of the heat receiving fin fixed to the heat receiving plate, and the plurality of second fins receive heat from the airflow. The heat received by the plurality of second fins is transferred to the heat receiving plate, and the heat receiving plate also receives heat from the airflow. Accordingly, the airflow flowing toward a region on a center side of the second surface is cooled. Then, the cooled airflow flows through the heat dissipating fin again in a process of flowing from the center of the second surface toward the outside.

In this way, a temperature of the airflow flowing through the heat dissipating fin can be maintained low by the heat receiving fin fixed to the heat receiving plate, and thus cooling efficiency of the wavelength conversion portion can be improved.

The airflow flowing through the heat dissipating fin flows through a space surrounded by the phosphor wheel, the peripheral wall, and the heat receiving plate to cool the heat dissipating fin. Therefore, a cooling structure of the wavelength conversion portion can be implemented to be compact.

Appendix 2

In the phosphor unit according to the Appendix 1,
- each of the plurality of second fins stands from the heat receiving plate and extends from a portion on a rotation axis side toward the peripheral wall.

According to such a configuration, the plurality of second fins can be disposed along a flow direction of the airflow flowing from the peripheral wall toward the rotation axis side. Accordingly, the airflow can be easily circulated between fins of the plurality of second fins, and the heat of the airflow can be easily received by the second fins. Therefore, efficiency of heat transfer from the airflow to the heat receiving fin can be improved.

Appendix 3

In the phosphor unit according to Appendix 1 or 2, the plurality of second fins include a plurality of heat receiving plate side fins disposed between the heat receiving plate and the heat dissipating fin in a direction along the rotation axis, and the plurality of heat receiving plate side fins allow an airflow turned back at the peripheral wall to flow toward the rotation axis side.

According to such a configuration, the plurality of heat receiving plate side fins can receive the heat from the airflow flowing toward the outside from the heat dissipating fin and turned back at the peripheral wall. Therefore, it is possible to cool the phosphor wheel by transferring the heat of the airflow to the heat receiving plate while circulating the airflow.

Appendix 4

In the phosphor unit according to Appendix 1 or 2, the plurality of second fins include a plurality of peripheral wall side fins disposed between the phosphor wheel and the peripheral wall in a direction orthogonal to the rotation axis, and the plurality of peripheral wall side fins allow the airflow that flowed toward the outside of the phosphor wheel to flow toward the peripheral wall.

According to such a configuration, it is possible to efficiently receive heat from the airflow that flowed through the heat dissipating fin using the plurality of peripheral wall side fins and to reduce a temperature of the airflow flowing through the heat dissipating fin. Therefore, cooling efficiency of the phosphor wheel can be improved.

By the plurality of peripheral wall side fins, the airflow circulating among the phosphor wheel, the peripheral wall and the heat receiving plate can be smoothly circulated.

Appendix 5

In the phosphor unit according to Appendix 1 or 2, the plurality of second fins include a plurality of peripheral wall side fins disposed between the phosphor wheel and the peripheral wall in a direction orthogonal to the rotation axis, and a plurality of heat receiving plate side fins provided on the rotation axis side with respect to the plurality of peripheral wall side fins and disposed between the heat receiving plate and the heat dissipating fin in a direction along the rotation axis, the plurality of peripheral wall side fins allow an airflow that flowed toward the outside of the phosphor wheel to flow toward the peripheral wall, and the plurality of heat receiving plate side fins allow an airflow turned back at the peripheral wall to flow toward the rotation axis side.

According to such a configuration, the airflow that flowed toward the outside of the phosphor wheel flows through the plurality of peripheral wall side fins and the plurality of heat receiving plate side fins, and then flows toward the rotation axis side. Therefore, it is possible to efficiently receive heat from the airflow, and to improve the cooling efficiency of the airflow flowing through the phosphor wheel, and thus the cooling efficiency of the wavelength conversion portion.

Therefore, since the cooling efficiency of the wavelength conversion portion with respect to a volume of the phosphor unit is high, a cooling structure of the wavelength conversion portion can be downsized. Therefore, it is possible to contribute to downsizing of the phosphor unit, and further to downsizing of a device such as a light source device in which the phosphor unit can be adopted.

Appendix 6

In the phosphor unit according to Appendix 5, the plurality of peripheral wall side fins are disposed along the circumferential direction around the rotation axis, the plurality of heat receiving plate side fins are disposed along the circumferential direction around the rotation axis, and an inter-fin pitch of the plurality of peripheral wall side fins is smaller than an inter-pitch of the plurality of heat receiving plate side fins.

According to such a configuration, the plurality of peripheral wall side fins can be densely disposed outside the plurality of heat receiving plate side fins. Therefore, a contact area between the peripheral wall side fins and the airflow can be increased, and the cooling efficiency of the airflow and the cooling efficiency of the phosphor wheel can be improved.

Appendix 7

In the phosphor unit according to any one of Appendixes 4 to 6, each of the plurality of peripheral wall side fins is inclined in a rotation direction of the phosphor wheel from an end portion on the rotation axis side toward the peripheral wall, and an intersection angle between a tangent line of an outer peripheral edge of the phosphor wheel located on a virtual line coupling an end portion of one of the plurality of peripheral wall side fins on the rotation axis side and the rotation axis, and an extending direction of the one peripheral wall side fin from the end portion on the rotation axis side is 350 or more and 850 or less.

According to such a configuration, the airflow that flowed out of the heat dissipating fin can efficiently flow between the fins of the plurality of peripheral wall side fins. Therefore, efficiency of receiving heat from the airflow by the plurality of peripheral wall side fins can be improved.

Appendix 8

In the phosphor unit according to Appendix 1, each of the plurality of second fins extends along a plane intersecting the rotation axis and is disposed along the rotation axis so as to overlap the heat receiving plate.

According to such a configuration, the airflow flows through the plurality of second fins disposed so as to overlap the heat receiving plate. Accordingly, the heat can be transferred from the airflow that received the heat of the wavelength conversion portion to the plurality of second fins, and a temperature of the airflow flowing through the wavelength conversion portion can be lowered.

Appendix 9

In the phosphor unit according to Appendix 8, the plurality of second fins include a plurality of heat receiving plate side fins provided between the heat receiving plate and the heat dissipating fin in a direction along the rotation axis and disposed along the rotation axis, and the plurality of heat receiving plate side fins allow an airflow turned back at the peripheral wall to flow toward the rotation axis side.

According to such a configuration, the plurality of heat receiving plate side fins receive heat from the airflow while allowing the airflow flowing from the heat dissipating fin to the peripheral wall and turned back at the peripheral wall to flow toward the rotation axis side. Accordingly, it is possible to receive heat from the airflow while smoothly circulating the airflow.

Appendix 10

In the phosphor unit according to Appendix 8 or 9, the plurality of second fins include a plurality of peripheral wall side fins provided between the phosphor wheel and the peripheral wall in a direction orthogonal to the rotation axis and disposed along the rotation axis, and the plurality of peripheral wall side fins allow an airflow that flowed toward the outside of the phosphor wheel to flow toward the peripheral wall.

According to such a configuration, the airflow that flowed through the heat dissipating fin flows through the peripheral wall side fins and then flows toward the peripheral wall. The airflow that flowed toward the peripheral wall is turned back at the peripheral wall, and then flows through the heat receiving fin toward the rotation axis side. Accordingly, it is possible to receive heat from the airflow while smoothly circulating the airflow.

Appendix 11

In the phosphor unit according to Appendix 8, the plurality of second fins include

- a plurality of peripheral wall side fins provided between the phosphor wheel and the peripheral wall in a direction orthogonal to the rotation axis and disposed along the rotation axis, and
- a plurality of heat receiving plate side fins provided between the heat receiving plate and the heat dissipating fin in a direction along the rotation axis and disposed along the rotation axis, the plurality of peripheral wall side fins allow an airflow that flowed toward the outside of the phosphor wheel to flow toward the peripheral wall, and the plurality of heat receiving plate side fins allow an airflow turned back at the peripheral wall to flow toward the rotation axis side.

According to such a configuration, the airflow that flowed toward the outside of the phosphor wheel flows through the plurality of peripheral wall side fins and the plurality of heat receiving plate side fins, and then flows toward the rotation axis side. Therefore, it is possible to efficiently receive heat from the airflow and to smoothly circulate the airflow. Therefore, it is possible to improve cooling efficiency of the airflow flowing through the phosphor wheel, and thus cooling efficiency of the wavelength conversion portion.

Appendix 12

A phosphor unit including:

a phosphor wheel configured to rotate around a rotation axis;

a heat receiving plate intersecting the rotation axis on the rotation axis, facing the phosphor wheel, and spaced apart from the phosphor wheel; and a heat receiving fin fixed to the heat receiving plate, wherein the phosphor wheel includes

- a substrate having a first surface and a second surface that is provided on an opposite side from the first surface and faces the heat receiving plate, and configured to rotate around the rotation axis,
- a wavelength conversion portion disposed on the first surface and containing a phosphor that converts a wavelength of incident light, and
- a heat dissipating fin disposed on the second surface, and including a plurality of first fins that generate an airflow in a direction from a center of the second surface toward outside by rotation of the substrate and dissipate heat transferred from the wavelength conversion portion to the generated airflow, the heat receiving fin includes

- a plurality of second fins configured to transfer received heat to the heat receiving plate, and
- a peripheral wall portion located outside the plurality of second fins with respect to the rotation axis, and the airflow flowing from the phosphor wheel circulates to the phosphor wheel via the peripheral wall portion and the plurality of second fins of the heat receiving fin.

According to such a configuration, similarly to the phosphor unit, the wavelength conversion portion can be effectively cooled.

That is, the airflow flowing from the phosphor wheel through the heat dissipating fin circulates to the phosphor wheel via the peripheral wall portion and the plurality of second fins. The circulating airflow flows through the plurality of second fins of the heat receiving fin fixed to the heat receiving plate, and the plurality of second fins receive heat from the airflow. The heat received by the plurality of second fins is transferred to the heat receiving plate, and the heat receiving plate also receives heat from the airflow. Accordingly, the airflow flowing through the heat dissipating fin is cooled.

In this way, a temperature of the airflow flowing through the heat dissipating fin can be maintained low by the heat receiving fin fixed to the heat receiving plate, and thus cooling efficiency of the wavelength conversion portion can be improved.

The airflow flowing through the heat dissipating fin circulates in a space surrounded by the phosphor wheel, the peripheral wall portion, and the plurality of second fins to cool the heat dissipating fin. Therefore, since the cooling efficiency of the wavelength conversion portion with respect to a volume of the phosphor unit is high, a cooling structure of the wavelength conversion portion can be downsized. Therefore, it is possible to contribute to downsizing of the phosphor unit, and further to downsizing of a device such as a light source device in which the phosphor unit can be adopted.

Appendix 13

In the phosphor unit according to any one of Appendixes 1 to 12, the heat receiving plate is formed of a vapor chamber.

According to such a configuration, the heat transferred from the heat dissipating fin to the heat receiving plate is diffused to the entire heat receiving plate that is the vapor chamber. Therefore, heat can be prevented from being locally transferred from the heat receiving plate to the heat dissipating device, and heat can be efficiently transferred from the heat receiving plate to the heat dissipating device. Therefore, heat can be efficiently dissipated by the heat dissipating device.

Appendix 14

The phosphor unit according to any one of Appendixes 1 to 13, further including:

a heat dissipating device provided on an opposite side from the phosphor wheel with respect to the heat receiving plate and configured to dissipate heat transferred to the heat receiving plate.

According to such a configuration, since the heat dissipated to the heat receiving plate can be dissipated by the heat dissipating device, the heat of the wavelength conversion portion can be quickly dissipated. Therefore, the cooling efficiency of the wavelength conversion portion can be improved.

Appendix 15

The phosphor unit according to Appendix 14, further including:

a heat pipe coupling the heat receiving fin and the heat dissipating device.

According to such a configuration, the heat received from the airflow by the heat receiving fin can be transferred not only to the heat receiving plate but also to the heat dissipating device. Therefore, the heat received by the heat receiving fin can be efficiently transferred to the heat dissipating device.

Appendix 16

The phosphor unit according to Appendix 14 or 15, further including:

a thermoelectric conversion element provided between the heat receiving plate and the heat dissipating device.

According to such a configuration, heat transfer from the heat receiving plate to the heat dissipating device can be assisted by the thermoelectric conversion element. Therefore, efficiency of heat transfer from the heat receiving plate to the heat dissipating device can be improved, and consequently, efficiency of dissipating heat of the wavelength conversion portion by the heat dissipating device can be improved.

Appendix 17

In the phosphor unit according to any one of Appendixes 14 to 16, the heat dissipating device includes a heat sink.

According to such a configuration, the heat transferred to the heat receiving plate is dissipated by the heat sink. Therefore, the heat dissipating device can be implemented by a relatively simple configuration.

Appendix 18

In the phosphor unit according to any one of Appendixes 14 to 16, the heat dissipating device transfers the transferred heat to the cooling liquid flowing therein.

According to such a configuration, the heat transferred from the heat receiving plate is transferred to the cooling liquid flowing therein, and thus efficiency of dissipating heat in the heat dissipating device can be improved. Therefore, the cooling efficiency of the wavelength conversion portion can be improved.

Appendix 19

A light source device including:

the phosphor unit according to any one of Appendixes 1 to 18; and a solid-state light emitting element configured to emit excitation light incident on the phosphor unit, wherein the phosphor unit emits light containing fluorescence obtained by converting a wavelength of the excitation light when the excitation light is incident on the phosphor unit.

According to such a configuration, since an amount of the excitation light incident on the wavelength conversion portion can be increased due to a high cooling effect of the wavelength conversion portion provided in the phosphor wheel, it is possible to implement the light source device that emits a large amount of light.

Appendix 20

A projector including:

the light source device according to Appendix 19;

a light modulation element configured to modulate light from the light source device into image light; and a projection optical device configured to project the image light. According to such a configuration, it is possible to attain the same effects as the light source device and to implement the projector capable of projecting the image light having high luminance.

What is claimed is:

1. A phosphor unit comprising:

a phosphor wheel configured to rotate around a rotation axis;

a peripheral wall surrounding the phosphor wheel along a circumferential direction around the rotation axis;

a heat receiving plate intersecting the rotation axis on the rotation axis, facing the phosphor wheel, and spaced apart from the phosphor wheel; and a heat receiving fin fixed to the heat receiving plate and surrounded by the peripheral wall, wherein the phosphor wheel includes a substrate having a first surface and a second surface that is provided on an opposite side from the first surface and faces the heat receiving plate, and configured to rotate around the rotation axis, a wavelength conversion portion disposed on the first surface and containing a phosphor that converts a wavelength of incident light, and a heat dissipating fin disposed on the second surface, and including a plurality of first fins that generate an airflow in a direction from a center of the second surface toward outside by rotation of the substrate and dissipate heat transferred from the wavelength conversion portion to the generated airflow, and the heat receiving fin includes a plurality of second fins through which an airflow circulating from the phosphor wheel to the phosphor wheel via the peripheral wall and the heat receiving plate flows, and that receives heat from the flowing airflow and transfers the heat to the heat receiving plate, wherein the plurality of second fins include a plurality of peripheral wall side fins, the plurality of peripheral wall side fins are disposed between the phosphor wheel and the peripheral wall in a direction orthogonal to the rotation axis, and wherein the plurality of peripheral wall side fins and the heat dissipating fin of the phosphor wheel are disposed to overlap each other in a direction orthogonal to the rotation axis.

2. The phosphor unit according to claim 1, wherein each of the plurality of second fins stands from the heat receiving plate and extends from a portion on a rotation axis side toward the peripheral wall.

3. The phosphor unit according to claim 1, wherein the plurality of second fins include a plurality of heat receiving plate side fins disposed between the heat receiving plate and the heat dissipating fin in a direction along the rotation axis, and the plurality of heat receiving plate side fins allow an airflow turned back at the peripheral wall to flow toward the rotation axis side.

4. The phosphor unit according to claim 1, wherein the plurality of peripheral wall side fins allow the airflow that flowed toward the outside of the phosphor wheel to flow toward the peripheral wall.

5. The phosphor unit according to claim 1, wherein the plurality of second fins include a plurality of peripheral wall side fins disposed between the phosphor wheel and the peripheral wall in a direction orthogonal to the rotation axis, and a plurality of heat receiving plate side fins provided on the rotation axis side with respect to the plurality of peripheral wall side fins and disposed between the heat receiving plate and the heat dissipating fin in a direction along the rotation axis, the plurality of peripheral wall side fins allow an airflow that flowed toward the outside of the phosphor wheel to flow toward the peripheral wall, and the plurality of heat receiving plate side fins allow an airflow turned back at the peripheral wall to flow toward the rotation axis side.

6. The phosphor unit according to claim 5, wherein the plurality of peripheral wall side fins are disposed along the circumferential direction around the rotation axis, the plurality of heat receiving plate side fins are disposed along the circumferential direction around the rotation axis, and an inter-fin pitch of the plurality of peripheral wall side fins is smaller than an inter-pitch of the plurality of heat receiving plate side fins.

7. The phosphor unit according to claim 4, wherein each of the plurality of peripheral wall side fins is inclined in a rotation direction of the phosphor wheel from an end portion on the rotation axis side toward the peripheral wall, and an intersection angle between a tangent line of an outer peripheral edge of the phosphor wheel located on a virtual line coupling an end portion of one of the plurality of peripheral wall side fins on the rotation axis side and the rotation axis, and an extending direction of the one peripheral wall side fin from the end portion on the rotation axis side is 35° or more and 85° or less.

8. The phosphor unit according to claim 1, wherein each of the plurality of second fins extends along a plane intersecting the rotation axis and is disposed along the rotation axis so as to overlap the heat receiving plate.

9. The phosphor unit according to claim 8, wherein the plurality of second fins include a plurality of heat receiving plate side fins provided between the heat receiving plate and the heat dissipating fin in a direction along the rotation axis and disposed along the rotation axis, and the plurality of heat receiving plate side fins allow an airflow turned back at the peripheral wall to flow toward the rotation axis side.

10. The phosphor unit according to claim 8, wherein the plurality of second fins include a plurality of peripheral wall side fins provided between the phosphor wheel and the peripheral wall in a direction orthogonal to the rotation axis and disposed along the rotation axis, and the plurality of peripheral wall side fins allow an airflow that flowed toward the outside of the phosphor wheel to flow toward the peripheral wall.

11. The phosphor unit according to claim 8, wherein the plurality of second fins include a plurality of peripheral wall side fins provided between the phosphor wheel and the peripheral wall in a direction orthogonal to the rotation axis and disposed along the rotation axis, and a plurality of heat receiving plate side fins provided between the heat receiving plate and the heat dissipating fin in a direction along the rotation axis and disposed along the rotation axis, the plurality of peripheral wall side fins allow an airflow that flowed toward the outside of the phosphor wheel to flow toward the peripheral wall, and the plurality of heat receiving plate side fins allow an airflow turned back at the peripheral wall to flow toward the rotation axis side.

12. A phosphor unit comprising:

a phosphor wheel configured to rotate around a rotation axis;

a heat receiving plate intersecting the rotation axis on the rotation axis, facing the phosphor wheel, and spaced apart from the phosphor wheel; and a heat receiving fin fixed to the heat receiving plate, wherein the phosphor wheel includes a substrate having a first surface and a second surface that is provided on an opposite side from the first surface and faces the heat receiving plate, and configured to rotate around the rotation axis, a wavelength conversion portion disposed on the first surface and containing a phosphor that converts a wavelength of incident light, and a heat dissipating fin disposed on the second surface, and including a plurality of first fins that generate an airflow in a direction from a center of the second surface toward outside by rotation of the substrate and dissipate heat transferred from the wavelength conversion portion to the generated airflow, the heat receiving fin includes a plurality of second fins configured to transfer received heat to the heat receiving plate, and a peripheral wall portion located outside the plurality of second fins with respect to the rotation axis, and the airflow flowing from the phosphor wheel circulates to the phosphor wheel via the peripheral wall portion and the plurality of second fins of the heat receiving fin, wherein:

the plurality of second fins include a plurality of peripheral wall side fins, the plurality of peripheral wall side fins are disposed between the phosphor wheel and the peripheral wall in a direction orthogonal to the rotation axis, and wherein the plurality of peripheral wall side fins and the heat dissipating fin of the phosphor wheel are disposed to overlap each other in a direction orthogonal to the rotation axis.

13. The phosphor unit according to claim 1, wherein the heat receiving plate is formed of a vapor chamber.

14. The phosphor unit according to claim 1, further comprising:

a heat dissipating device provided on an opposite side from the phosphor wheel with respect to the heat receiving plate and configured to dissipate heat transferred to the heat receiving plate.

15. The phosphor unit according to claim 14, further comprising:

a heat pipe coupling the heat receiving fin and the heat dissipating device.

16. The phosphor unit according to claim 14, further comprising:

a thermoelectric conversion element provided between the heat receiving plate and the heat dissipating device.

17. The phosphor unit according to claim 14, wherein the heat dissipating device includes a heat sink.

18. The phosphor unit according to claim 14, wherein the heat dissipating device transfers the transferred heat to a cooling liquid flowing therein.

19. A light source device comprising:

the phosphor unit according to claim 1; and a solid-state light emitting element configured to emit excitation light incident on the phosphor unit, wherein the phosphor unit emits light containing fluorescence obtained by converting a wavelength of the excitation light when the excitation light is incident on the phosphor unit.

20. A projector comprising:

the light source device according to claim 19;

a light modulation element configured to modulate light from the light source device into image light; and a projection optical device configured to project the image light.

* * * * *